(12) United States Patent
Okuhara et al.

(10) Patent No.: US 9,067,563 B2
(45) Date of Patent: Jun. 30, 2015

(54) HEAD PROTECTION AIRBAG APPARATUS

(71) Applicant: TOYODA GOSEI CO., LTD., Kiyosu-shi, Aichi-ken (JP)

(72) Inventors: Masaaki Okuhara, Kiyosu (JP); Koji Kawamura, Kiyosu (JP); Tatsuya Hashido, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/479,459

(22) Filed: Sep. 8, 2014

(65) Prior Publication Data

US 2015/0084316 A1 Mar. 26, 2015

(30) Foreign Application Priority Data

Sep. 26, 2013 (JP) ................................. 2013-200438
May 22, 2014 (JP) ................................. 2014-106495

(51) Int. Cl.
*B60R 21/16* (2006.01)
*B60R 21/2338* (2011.01)
*B60R 21/232* (2011.01)
*B60R 21/00* (2006.01)

(52) U.S. Cl.
CPC ........... *B60R 21/2338* (2013.01); *B60R 21/232* (2013.01); *B60R 2021/0009* (2013.01); *B60R 2021/0048* (2013.01); *B60R 2021/23386* (2013.01)

(58) Field of Classification Search
USPC ......................... 280/729, 730.2, 743.1, 743.2
See application file for complete search history.

(56) References Cited

U.S. PATENT DOCUMENTS

| | | | | |
|---|---|---|---|---|
| 6,155,597 A * | 12/2000 | Bowers et al. | ............. | 280/730.2 |
| 6,176,515 B1 * | 1/2001 | Wallner et al. | ............. | 280/730.2 |
| 6,224,091 B1 * | 5/2001 | Eyrainer et al. | ........... | 280/730.2 |
| 6,375,214 B1 | 4/2002 | Nishikaji | | |
| 6,709,010 B2 * | 3/2004 | Dominissini et al. | ...... | 280/730.2 |
| 6,808,203 B2 * | 10/2004 | Takahara | ....................... | 280/740 |
| 7,264,267 B2 * | 9/2007 | Kino et al. | .................. | 280/728.2 |
| 7,658,401 B2 * | 2/2010 | Valdez et al. | .............. | 280/730.2 |
| 7,661,701 B2 * | 2/2010 | Hirata | ......................... | 280/730.2 |
| 7,735,863 B2 * | 6/2010 | Walston et al. | ............... | 280/749 |
| 7,823,922 B2 * | 11/2010 | Mitchell et al. | ............. | 280/743.2 |
| 7,828,321 B2 * | 11/2010 | Bakhsh et al. | ............. | 280/730.2 |
| 8,505,967 B2 * | 8/2013 | Shamoto | .................... | 280/730.2 |
| 2008/0079246 A1 * | 4/2008 | Dix | ............................ | 280/730.2 |

FOREIGN PATENT DOCUMENTS

JP 2008-6895 A 1/2008

* cited by examiner

*Primary Examiner* — Toan To
(74) *Attorney, Agent, or Firm* — Posz Law Group, PLC

(57) ABSTRACT

In a head protection airbag apparatus, an airbag includes an airbag body and a tension cloth. The airbag body has an end side inflation portion which is arranged in an end portion on the tension cloth side. The end side inflation portion is divided from other general inflation sections in the airbag body by a division portion. The tension cloth is in an arranged state so as to cover an inner vehicle side of the end side inflation portion, allows the base portion side to be joined to an front edge side of the end side inflation portion, is inserted into a slit formed in the division portion while being inverted so as to cover an outer vehicle side of the end side inflation portion, and allows the leading end side to be fixed to the vehicle body side.

11 Claims, 21 Drawing Sheets

HEAD PROTECTION AIRBAG APPARATUS

CROSS REFERENCE TO RELATED APPLICATIONS

The Present application claims priority from Japanese Patent Applications No. 2013-200438 of Okuhara et al., filed on Sep. 26, 2013, No. 2014-106495 of Okuhara et al., filed on May 22, 2014, the disclosure of which is hereby incorporated into the present application by reference.

BACKGROUND OF THE INVENTION

1. Field of the Invention

The present invention relates to a head protection airbag apparatus having a configuration including an airbag which is configured to be folded and accommodated on an upper edge side of a window on an inner vehicle side, of which the upper edge side is fixedly attached onto a vehicle body side, and which allows inflation gas to flow in from an inflator to deploy and inflate so as to protrude downward and cover the inner vehicle side of the window. The present invention particularly relates to a head protection airbag apparatus which is suitable for use at the time of a diagonal collision in which an impact force acts from a front diagonal direction or a rear diagonal direction.

2. Description of Related Art

In the related art, JP-A-2008-6895 discloses a head protection airbag apparatus which can protect the head of an occupant at the time of a diagonal collision. In the head protection airbag apparatus in the related art, an airbag has an airbag body and a tension cloth which can generate tension substantially along the airbag body in a front-rear direction at the time of completion of inflation. A base portion side of the tension cloth is joined to a division portion which divides an end side inflation portion arranged on a front end side from other general inflation sections in the airbag body. The end side inflation portion is caused to protrude toward an inner vehicle side from the general inflation section at the time of completion of inflation of the airbag by the tension cloth which is arranged between the end side inflation portion and a window.

JP-A-2001-18743 discloses a head protection airbag apparatus which is configured to include an airbag adopting a tension cloth. In the head protection airbag apparatus in the related art, a belt-shaped tension cloth is arranged on a lower edge side of an airbag body, and an opening through which the belt-shaped tension cloth can be inserted is arranged on a lower end side in the vicinity of a front end of the airbag body. In the head protection airbag apparatus in the related art, the tension cloth allows a base portion side to be joined to an inner vehicle side surface on a front edge side of a portion of an inflation portion which is arranged closer to the front than the opening in the airbag body, and is arranged so as to surround the inflation portion via the opening, thereby fixing a leading end side onto the vehicle body side.

In the first head protection airbag apparatus in the related art, the base portion side of the tension cloth is joined to the outer vehicle side of the division portion arranged on a rear end side of the end side inflation portion, the end side inflation portion is protruded further toward the inner vehicle side than the general inflation section so as to thrust the end side inflation portion out toward the inner vehicle side by tension generated in the tension cloth along the front-rear direction at the time of completion of inflation of the airbag body. However, in the head protection airbag apparatus in the related art, there is room for improvement in regards to the end side inflation portion being further significantly protruded toward the inner vehicle side.

In the second head protection airbag apparatus in the related art, since the tension cloth is arranged on the lower end of the airbag body, it is difficult to significantly protrude the inflation portion itself on the front end side of the airbag body toward the inner vehicle side.

SUMMARY OF THE INVENTION

An object of the present invention is to solve the above-described problem and to provide a head protection airbag apparatus in which an end side inflation portion can significantly protrude toward an inner vehicle side by a tension cloth at the time of completion of inflation of an airbag and by which the head of an occupant can be invariably protected at the time of a diagonal collision as well.

The object of the present invention can be achieved through a head protection airbag apparatus having the following configurations.

A head protection airbag apparatus includes an airbag which is configured to be folded and accommodated on an upper edge side of a window on an inner vehicle side, of which the upper edge side is fixedly attached onto a vehicle body side, and which allows inflation gas to flow in to deploy and inflate so as to protrude downward and cover the inner vehicle side of the window, and an inflator which supplies the inflation gas to the airbag.

The airbag includes a flexible bag-like airbag body of which the upper edge side is fixed to the vehicle body side on the upper edge side of the window at a plurality of places along a front-rear direction, and a flexible sheet material-made tension cloth of which a base portion side is joined to one end portion side in the front-rear direction in the airbag body and of which a leading end side is fixed to the vehicle body side on a peripheral edge of the window away from the end portion of the airbag body.

The airbag body includes an end side inflation portion arranged at an end portion which becomes the tension cloth side at the time of completion of inflation.

The end side inflation portion is divided from other general inflation sections in the airbag body by a division portion which is positioned on a central side of the airbag body in the front-rear direction and arranged substantially along a vertical direction.

The tension cloth is disposed in an arranged state so as to cover the inner vehicle side of the end side inflation portion, allows the base portion side to be joined to an end edge side of the end side inflation portion in the front-rear direction, is inserted into a slit formed in the division portion while being inverted so as to cover an outer vehicle side of the end side inflation portion, and allows the leading end side to be fixed to the vehicle body side.

In the head protection airbag apparatus according to the present invention, when there is an occurrence of tension in the tension cloth so as to be along the front-rear direction at the time of completion of inflation of the airbag body, the end side inflation portion exhibits an aspect so as to thrust out toward the inner vehicle side by the tension cloth, thereby protruding toward the inner vehicle side. In this case, the end side inflation portion easily moves with respect to a general inflation section, and smoothly and significantly thrusts out toward the inner vehicle side. This is because the end side inflation portion is partially divided from the general inflation section which is arranged on the central side in the front-rear direction by the slit through which the tension cloth passes. In the head protection airbag apparatus according to the present invention, the tension cloth allows the base portion side to be joined to the end edge side of the end side inflation portion on the inner vehicle side, is inverted via the slit formed in the division portion which divides the end side inflation portion from the general inflation section, and allows the leading end side to be fixed to the vehicle body side so as to wrap an outer peripheral surface of the end side inflation portion across the inner vehicle side to the outer vehicle side. Therefore, when there is an occurrence of tension in the tension cloth so as to be along the front-rear direction at the time of completion of inflation of the airbag body, the tension cloth is in a state where the base portion side fixed to the end edge side of the end side inflation portion is stretched so as to be oriented toward the inner vehicle side while being separated from the leading end side in response to the tension. The end edge side of the end side inflation portion connected onto the base portion side of the tension cloth is oriented significantly toward the inner vehicle side in response to the tension. The end side inflation portion is divided from the general inflation section by the division portion arranged substantially along the vertical direction, thereby completing inflation by forming an inflation portion substantially along the vertical direction. Therefore, the end side inflation portion thrusts out significantly toward the inner vehicle side by the tension cloth across the vertically wide range at the time of completion of inflation of the airbag.

Accordingly, in the head protection airbag apparatus according to the present invention, the end side inflation portion can protrude significantly toward the inner vehicle side by the tension cloth at the time of completion of inflation of the airbag, and thus, it is possible to invariably protect the head of an occupant at the time of a diagonal collision.

In the head protection airbag apparatus according to the present invention, it is preferable that the tension cloth be arranged at a position upwardly away from a lower edge of the end side inflation portion at the time of completion of inflation. In the head protection airbag apparatus having such a configuration, since the upper edge side of the airbag body is fixed to the body side, it is possible to secure a great amount of protrusion of a portion on the lower end side of the end side inflation portion toward the inner vehicle side, compared to a case where the tension cloth is arranged on a lower edge side of the end side inflation portion so as to increase a separation distance from a fixing point on the upper edge side, similarly to the head protection airbag apparatus in the related art. This is because an arrangement position of the tension cloth has a short separation distance from the fixing point to the body side on account of the above-described configuration even though the portion itself of the end side inflation portion at the arrangement position of the tension cloth has the amount of protrusion toward the inner vehicle side equivalent to that in the related art. Moreover, this is because, on the lower end side of the end side inflation portion having a long separation distance from the fixing point, that a great amount of protrusion toward the inner vehicle side can be secured equivalently to the lengthened portion in direct proportion thereto. Therefore, the portion on the lower end side of the end side inflation portion can invariably protrude significantly toward inner vehicle side at the time of completion of inflation of the airbag. As a result, in the head protection airbag apparatus having the above-described configuration, it is possible to invariably receive the head of an occupant moving downward while moving diagonally forward or diagonally rearward at the time of a diagonal collision by a portion on the lower end side of the end side inflation portion significantly protruding toward the inner vehicle side.

In the head protection airbag apparatus having the above-described configuration, it is preferable that the airbag is folded and accommodated from a flatly deployed state, first, the end edge side of the end side inflation portion in the front-rear direction is such folded back at a folding line substantially along the vertical direction that a portion on the end edge side of the end side inflation portion in the front-rear direction is oriented toward the inner vehicle side, then the folded back airbag body ant the tension cloth which is arranged while maintaining a state of being extended from a joining portion joined to the airbag body to the central side in the front-rear direction are folded to cause a lower edge side to approach the upper edge side.

In the head protection airbag apparatus having the above-described configuration, when folding and accommodating the airbag, the end edge side of the airbag body is folded back to be arranged so as to extend the tension cloth from the joining portion joined to the airbag body so that the airbag body and the tension cloth are folded together. Therefore, it is possible to set the actual length dimension of the tension cloth extending from the folded-back end edge side of the airbag body on the front-rear direction side to be small. As a result, it is possible to generate greater tension in the tension cloth at the time of completion of inflation of the airbag body. The airbag body is decreased in width dimension in the vertical direction to be folded so as to cause the lower edge side to approach the upper edge side in a state where the end edge side in the front-rear direction is folded back toward the inner vehicle side. Therefore, the airbag body is arranged to cause the end edge side to be oriented toward the inner vehicle side from the beginning of inflation. As a result, in the head protection airbag apparatus having the above-described configuration, the end edge side of the end side inflation portion can be more smoothly oriented toward the inner vehicle side at the time of completion of inflation as well as the length dimension of the tension cloth can be decreased.

In the head protection airbag apparatus having the above-described configuration, it is preferable that the tension cloth allow the base portion side to be joined to the end edge side of the end side inflation portion in the front-rear direction so as to cause the leading end to be oriented toward a direction side separated from the airbag body in a state before inversion. In the head protection airbag apparatus having such a configuration, when the airbag body is folded back, a portion in the vicinity of the joining portion in which the base portion side of the tension cloth is joined to the airbag body can be suppressed from being overlapped in multiple layers and being increased in size. Therefore, it is possible to suppress the airbag from being partially thickened, thereby making it possible to be compactly folded.

In the head protection airbag apparatus having the above-described configuration, it is preferable that the airbag body be provided with a protrusion piece portion which is partially protruded in order to join the base portion side of the tension cloth onto the end edge side of the end side inflation portion in the front-rear direction, and the airbag body be folded back at the folding line in a portion which becomes the base portion side of the protrusion piece portion rather than the joining portion to which the base portion side of the tension cloth is joined. In the head protection airbag apparatus having such a configuration, only the protrusion piece portion is arranged to be folded and overlapped without having a portion of the airbag body on the top and the bottom of the protrusion piece portion when being folded back. Therefore, compared to a case where the entire end edge side of the airbag body is folded back, the portion on the end edge side of the airbag body can be suppressed from being increased in size, and thus, it is possible to more compactly fold the airbag.

In the head protection airbag apparatus having the above-described configuration, it is preferable that the tension cloth includes an extention portion extending to a fixing portion side toward the body side of the tension cloth to extend from the base portion side and distant from the folding line, on the inner vehicle side of the folded-back end side inflation portion.

Then, it is preferable that the leading end side of the extension portion be configured to be distant from the folding line to be temporarily joined to the fixing portion side toward the body side of the tension cloth, and be able to release the temporarily joined state at the time of deployment and inflation of the airbag.

In accordance with the above-described configuration of the head protection airbag apparatus, the tension cloth has the extension portion and is temporarily joined in the vicinity of the folding line of the end side inflation portion which is folded back toward the inner vehicle side by the extension portion. Therefore, despite of having the configuration in which the end edge side of the end side inflation portion is folded back, the tension cloth is in a state of integrally protruding from the end side inflation portion in the folded-back state, and thus, workability of folding thereof becomes favorable when folding the airbag body so as to cause the lower edge side to approach the upper edge side. Since a portion in which the leading end side of the extension portion is temporarily joined to the fixing portion side toward the body side of the tension cloth is configured to release the temporarily joined state at the time of deployment and inflation of the airbag, it is possible to inflate the airbag with no difficulty.

In the head protection airbag apparatus having the above-described configuration, it is preferable that an end side attachment portion fixing a portion of the end side inflation portion side on the upper edge side of the airbag body onto the vehicle body side be configured to be arranged at a position which becomes the central side of the airbag body in the front-rear direction rather than the end edge side of the end side inflation portion in the front-rear direction, and to cause an attachment position toward the body side to be positioned further upward than other attachment portions.

In accordance with the above-described configuration of the head protection airbag apparatus, the end side attachment portion which is arranged in a region of the end side inflation portion is attached onto the body side at a position farther away to the upper side than other attachment portions. Therefore, when folding back the portion on the end edge side of the end side inflation portion in the front-rear direction so as to be oriented toward the inner vehicle side, even if the portion is folded back at a portion immediately below the end side attachment portion regarding the end side attachment portion, it is possible to attach the upper end side onto the body side with no difficulty if a region on the lower end side is twisted when attaching the folded airbag onto the vehicle body side so as to cause the lower edge side to approach the upper edge side after the folding. As a result, despite having the configuration including the end side attachment portion, the end edge side of the end side inflation portion in the front-rear direction can be folded back toward the inner vehicle side with no difficulty, and thus, it is possible to secure a degree of freedom of a position while being folded back.

In the head protection airbag apparatus according to the present invention, it is preferable that an end side attachment portion fixing a portion of the end side inflation portion side on the upper edge side of the airbag body onto the vehicle body side be arranged at a position which becomes the central side of the airbag body in the front-rear direction rather than the end edge side of the end side inflation portion in the front-rear direction. In the head protection airbag apparatus having such a configuration, the end side attachment portion which becomes the fixing point with respect to the body side is positioned on the central side in the front-rear direction rather than the end edge in the front-rear direction of the end side inflation portion. Therefore, it is possible to increase the length of the portion on the end edge side of the end side inflation portion which is stretched toward the inner vehicle side equivalently to the separation distance on the front-rear direction side (horizontal direction side) from the end edge of the end side attachment portion in the front-rear direction at the time of completion of inflation of the airbag. As a result, the end edge side of the end side inflation portion can significantly protrude toward the inner vehicle side along the horizontal direction.

In the head protection airbag apparatus having the above-described configuration, it is preferable that the end side attachment portion be arranged at the position which becomes the central side of the airbag body in the front-rear direction rather than the slit. In the head protection airbag apparatus having such a configuration, the end side attachment portion which becomes the fixing point with respect to the body side is arranged in a region deviated from the end side inflation portion. Therefore, at the time of completion of inflation of the airbag body, movements of the end side inflation portion toward the inner vehicle side are not regulated by the end side attachment portion, and a region on the upper end side of the end side inflation portion can significantly thrust out toward the inner vehicle side by the tension cloth with no difficulty.

In the head protection airbag apparatus having the above-described configuration, it is preferable that the end side inflation portion be configured to be occluded on a lower end side and to cause the lower end side to be positioned on the end edge side in the front-rear direction rather than the slit. In the head protection airbag apparatus having such a configuration, at the time of completion of inflation of the airbag body, the entire region throughout the lower end side in the front-rear direction in the end side inflation portion can be smoothly bent at a portion as a starting point where the slit is arranged. Therefore, the entire region on the lower end side of the end side inflation portion can smoothly and significantly thrust out toward the inner vehicle side by the tension cloth with no difficulty.

In the head protection airbag apparatus having the above-described configuration, the end side inflation portion may be configured to have a peripheral length on a direction side substantially along the front-rear direction of a tension cloth arrangement region in which the tension cloth is arranged to be smaller than a peripheral length on a direction side substantially along the front-rear direction of other regions which are vertically deviated from the tension cloth arrangement region at the time of completion of inflation.

In accordance with the above-described configuration of the head protection airbag apparatus, at the time of completion of inflation of the airbag body, the end side inflation portion inflates so as to cause the tension cloth arrangement region in which the tension cloth is arranged on the outer peripheral side to be more depressed than other regions which are vertically deviated from the tension cloth arrangement region. Therefore, the tension cloth exhibits an aspect of fitting in the depressed region so that the tension cloth can be suppressed from vertically moving with respect to the end side inflation portion, when the airbag body receives the head of an occupant. As a result, it is possible to protect the head of an occupant more invariably by the end side inflation portion when completely inflated.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
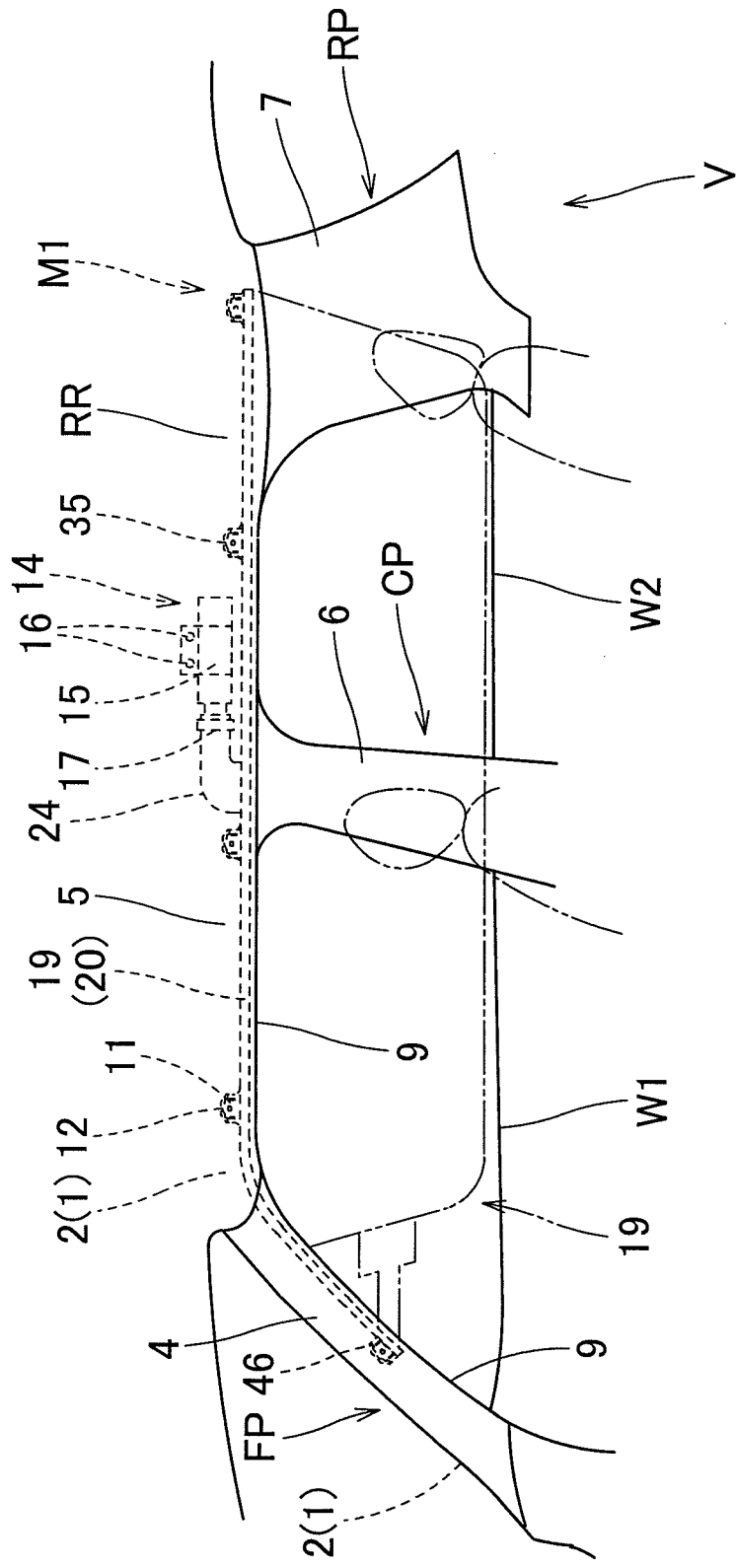
FIG. 1 is a schematic front view of a head protection airbag apparatus according to a first embodiment of the present invention, seen from an inner vehicle side.

Hereinafter, an embodiment of the present invention will be described with reference to the drawings. As illustrated in FIG. 1, a head protection airbag apparatus M1 of a first embodiment is mounted on a two-row seat-type vehicle V having two windows (side windows) W1 and W2. The head protection airbag apparatus M1 of the first embodiment includes an airbag 19, an inflator 14, attachment brackets 11 and 15, and an airbag cover 9. As illustrated in FIG. 1, the airbag 19 is folded and accommodated from a lower edge side of a front pillar portion FP to an upper region of a rear pillar portion RP via a lower edge side of a roof side rail portion RR in an upper edge side of the windows W1 and W2 on an inner vehicle side of the vehicle V.

Figure 7:
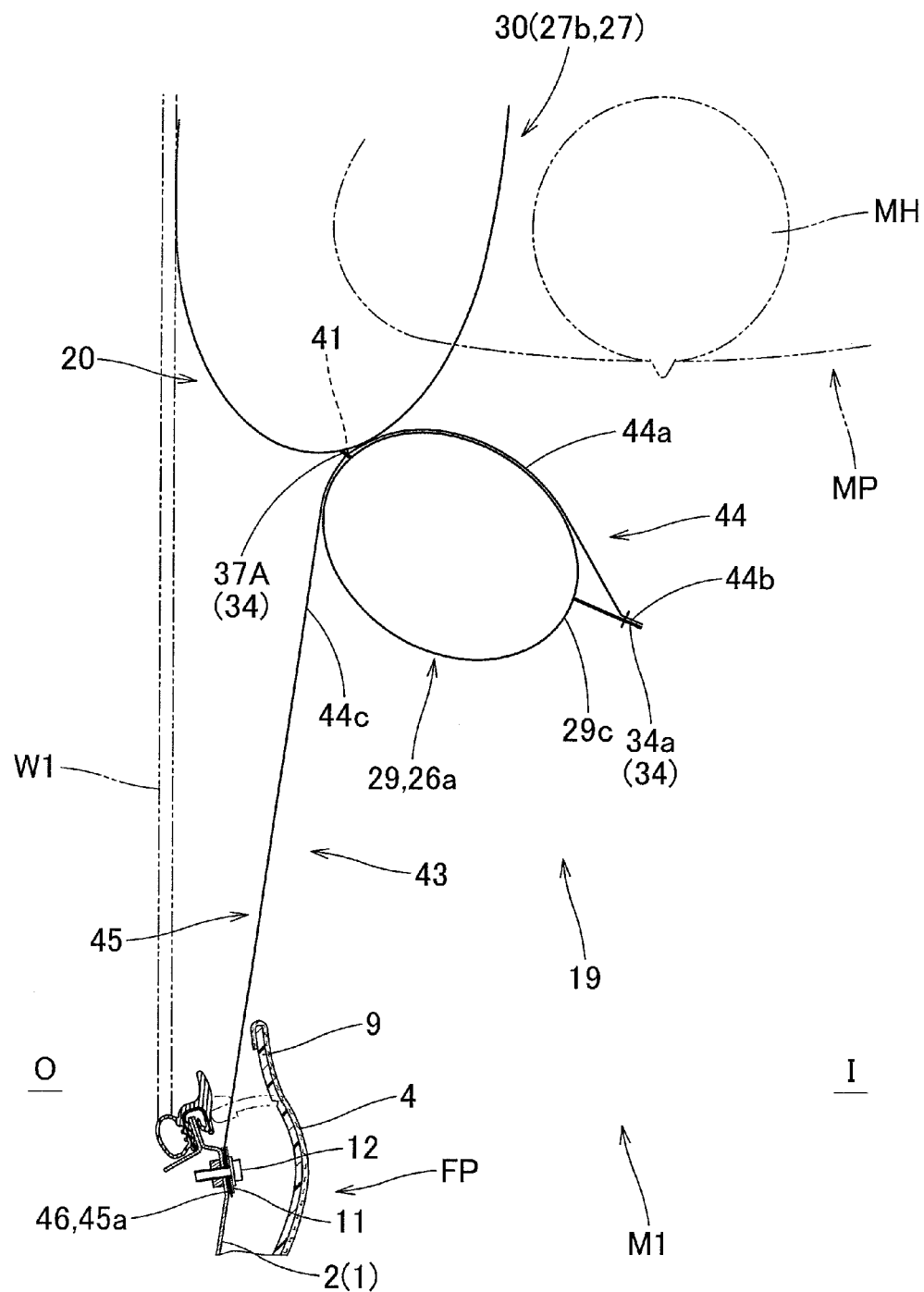
FIG. 7 is a schematic cross-sectional view along the front-rear direction illustrating a state where the airbag is completely inflated in the head protection airbag apparatus according to the first embodiment.
Figure 8:
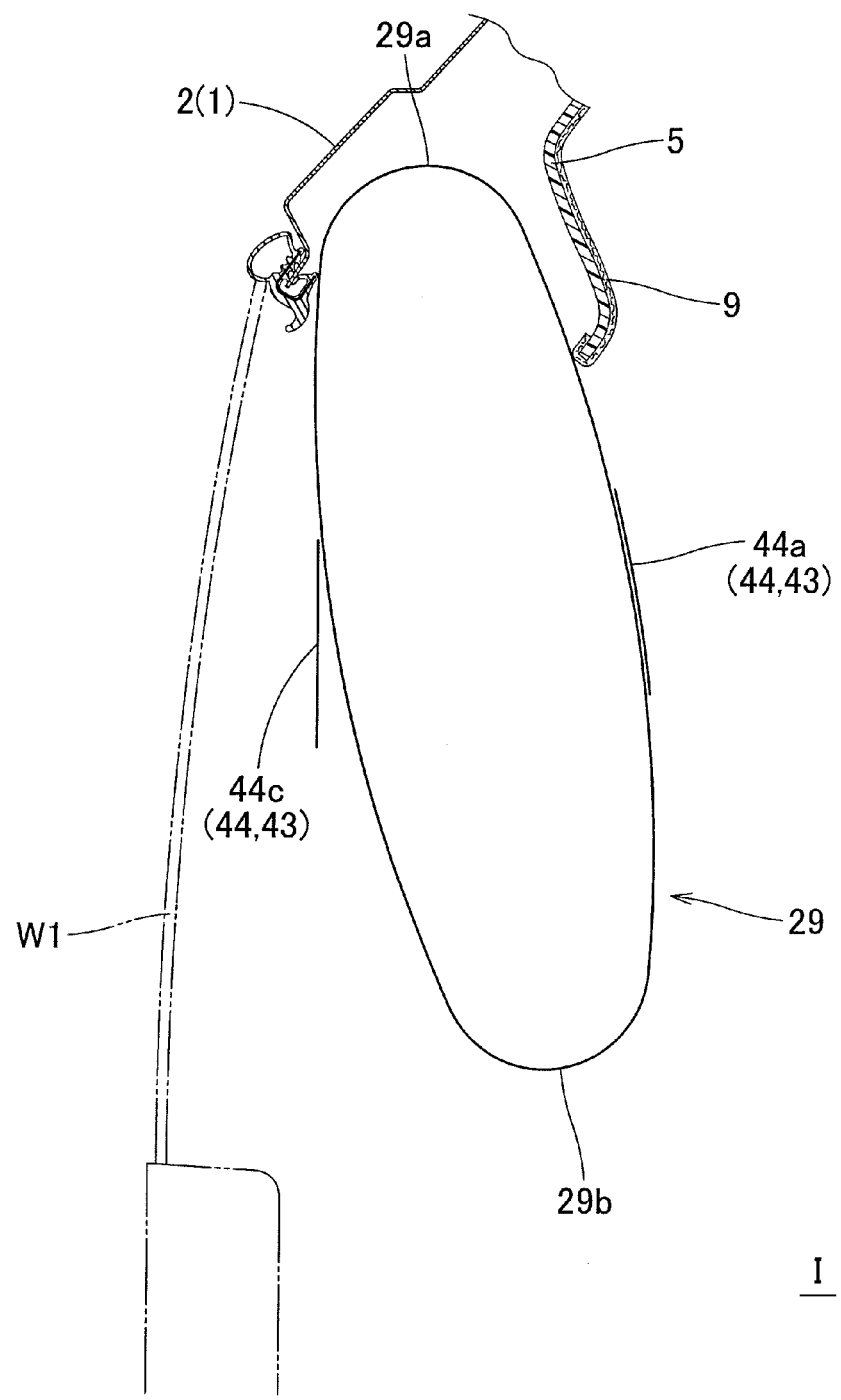
FIG. 8 is a schematic cross-sectional view along a vertical direction illustrating a state where the airbag is completely inflated in the head protection airbag apparatus according to the first embodiment.

As illustrated in FIGS. 1 and 7, the airbag cover 9 is formed from the lower edges of a front pillar garnish 4 disposed in the front pillar portion FP and a roof head lining 5 disposed in the roof side rail portion RP. The front pillar garnish 4 and the roof head lining 5 are made of a synthetic resin. The front pillar garnish 4 is fixedly attached onto the inner vehicle side of an inner panel 2 on a body 1 (vehicle body) side, in the front pillar portion FP. The roof head lining 5 is fixedly attached onto the inner vehicle side of the inner panel 2 on a body 1 (vehicle body) side, in the roof side rail portion RR. The airbag cover 9 covers the inner vehicle side of the airbag 19 that is folded and accommodated. The airbag cover 9 is configured to be openable when pressed by the airbag 19 in order to allow the airbag 19 to protrude toward the inner vehicle side at the time of deployment and inflation (refer to FIGS. 7 and 8).

The inflator 14 supplies the inflation gas to the airbag 19 and has the substantially columnar cylinder-type outer shape, as illustrated in FIG. 1. A gas discharge port (not illustrated) that can discharge the inflation gas is arranged on the leading end side of the inflator 14. In the inflator 14, the leading end side including the vicinity of the gas discharge port is inserted into a below-described gas inflow port portion 24 of the airbag 19. The inflator 14 is connected to the airbag 19, utilizing a clamp 17 that is arranged on an outer peripheral side of a rear end 24a of the gas inflow port portion 24. As illustrated in FIG. 1, the inflator 14 is fixed to the inner panel 2 on the body 1 (vehicle body) side utilizing an attachment bracket 15 and bolts 16. Specifically, the inflator 14 is attached to an upper side of a center pillar portion CP. The inflator 14 is electrically connected to a control device (not illustrated) of the vehicle V through a lead wire (not illustrated). The inflator 14 is configured to operate by inputting an operation signal from the control device when the control device detects a side collision or a diagonal collision of the vehicle V.

The attachment bracket 11 is configured to have two sheet metal plates. The attachment bracket 11 is attached to each of below-described attachment portions 35 and 46 of the airbag 19 so as to interpose each of the attachment portions 35 and 46 therebetween. The attachment bracket 11 causes each of the attachment portions 35 and 46 to be fixedly attached to the inner panel 2 on the body 1 side, utilizing an attachment bolt 12 (refer to FIGS. 1 and 7).

Figure 2:
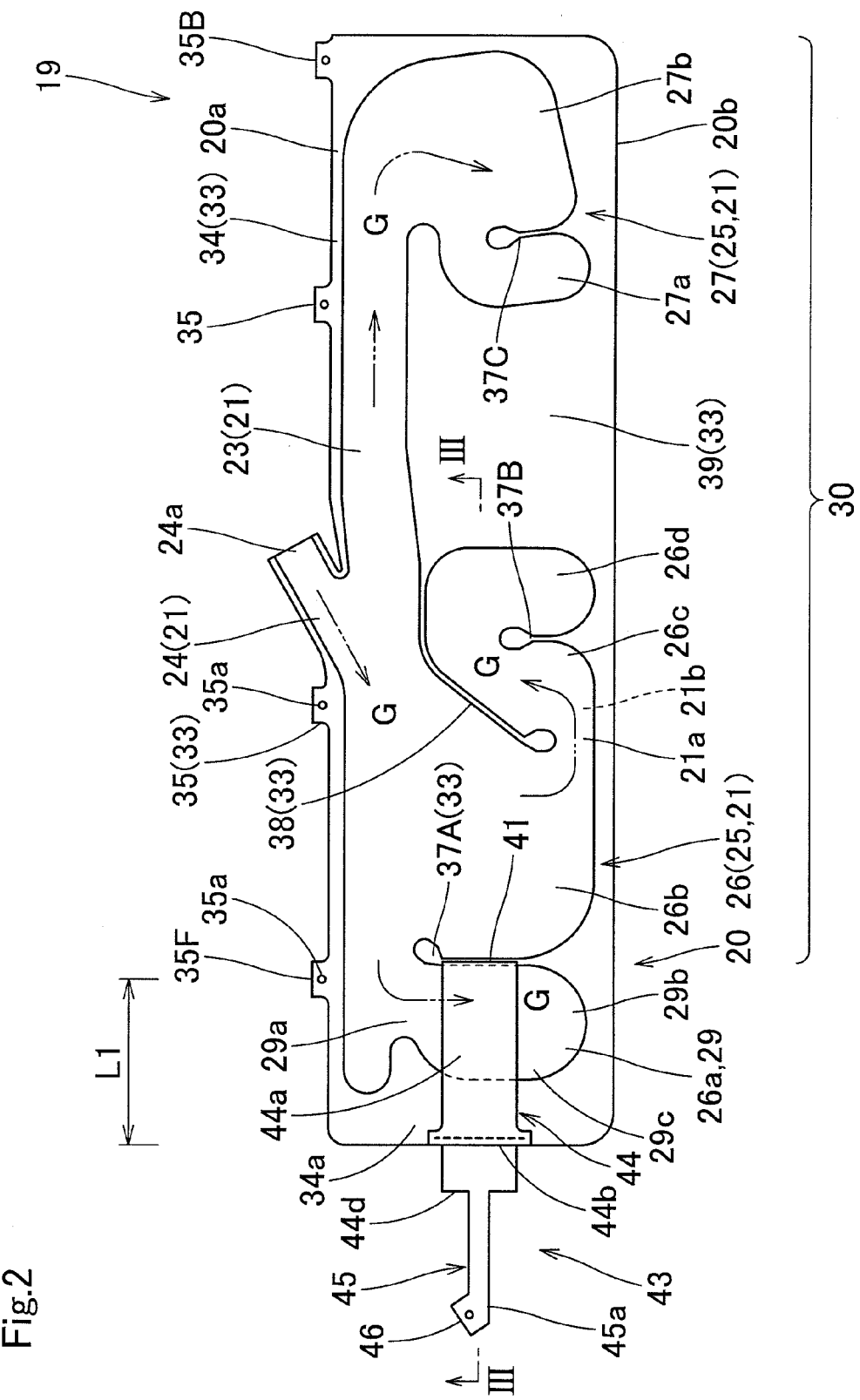
FIG. 2 is a front view illustrating a flatly deployed state of an airbag which is used in the head protection airbag apparatus according to the first embodiment.

As illustrated in FIG. 2, the airbag 19 includes an airbag body 20 and a tension cloth 43 that is joined to one end side of the airbag body 20 in a front-rear direction (front end side in the embodiment).

Figure 3:
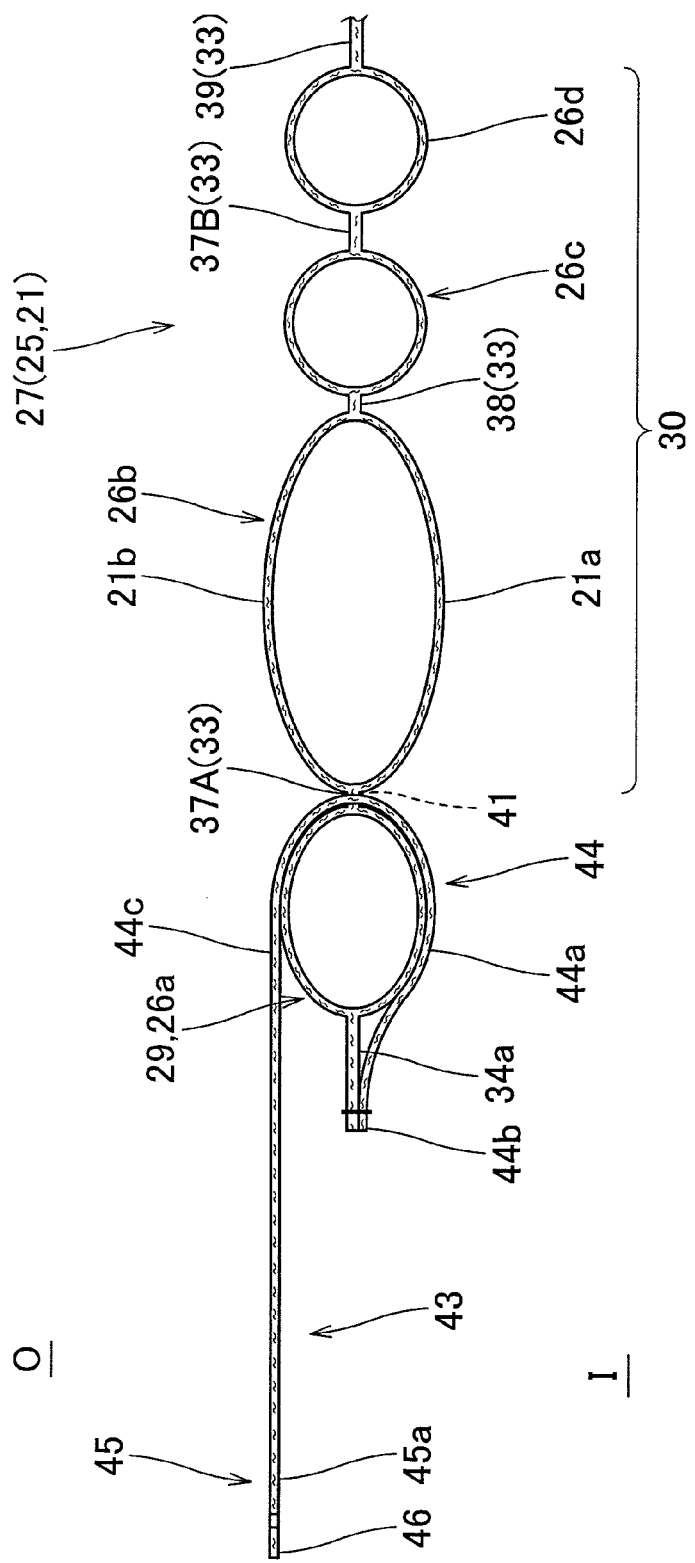
FIG. 3 is a partially enlarged cross-sectional view of a portion taken along line III-III in FIG. 2.

The airbag body 20 is deployed by allowing the inflation gas from the inflator 14 to flow in. Specifically, as indicated by a two-dot chain line in FIG. 1 and illustrated in FIG. 5, the airbag body 20 deploys and inflates so as to cover the inner vehicle side of windows W1 and W2, a pillar garnish 6 of the center pillar portion CP arranged between the windows W1 and W2, and a pillar garnish 7 of the rear pillar portion RP arranged on a rear side of the window W2. In the embodiment, the airbag body 20 is manufactured through double weaving using polyamide yarns, polyester yarns, or the like. As illustrated in FIGS. 2 and 3, the airbag body 20 includes an inner vehicle side wall portion 21a positioned on an inner vehicle side I at the time of completion of inflation, and an outer vehicle side wall portion 21b positioned on an outer vehicle side O. The airbag body 20 has a gas inflow portion 21 that inflates by allowing the inflation gas to flow in so as to separate the inner vehicle side wall portion 21a and the outer vehicle side wall portion 21b. The airbag body 20 has a non-inflow portion 33 that does not allow the inflation gas to flow in.

The gas inflow portion 21 includes the gas inflow port portion 24, a gas guide flow channel 23, and a protection inflation portion 25. In the airbag body 20 of the embodiment, a vertical cell 26a that is arranged on a front end side of a below-described inflation portion 26 for front seat is referred to as an end side inflation portion 29 in the gas inflow portion 21. In the gas inflow portion 21 of the airbag body 20, a general inflation section 30 is configured by the portion other than the vertical cell 26a.

The gas guide flow channel 23 is disposed on an upper edge 20a side of the airbag body 20 across substantially the entire region from the front to the rear so as to extend substantially along the front-rear direction. The gas guide flow channel 23 has a configuration in which an inflation gas G discharged from the inflator 14 is guided to a region of the protection inflation portion 25 that is arranged below the gas guide flow channel 23. The gas inflow port portion 24 connected to the inflator 14 communicates with the gas guide flow channel 23. The gas inflow port portion 24 is arranged so as to protrude upward from the vicinity of the middle of the front to the rear in the gas guide flow channel 23. The gas inflow port portion 24 is formed to be inclined upward to the rear with respect to the gas guide flow channel 23. The rear end 24a side of the gas inflow port portion 24 is open allowing the inflator 14 to be inserted therethrough. The gas inflow port portion 24 is connected to the inflator 14 utilizing the clamp 17 that is arranged on an outer peripheral side, in a state where the inflator 14 is inserted therethrough.

The protection inflation portion 25 includes the inflation portion 26 for front seat and an inflation portion 27 for rear seat. The inflation portion 26 for front seat is a portion that is arranged to cover the inner vehicle side of the window W1 arranged at the side of the front seat at the time of completion of inflation. The inflation portion 27 for rear seat is a portion that is arranged to cover the inner vehicle side of the window W2 arranged at the side of the rear seat at the time of completion of inflation. Inner regions of each of the inflation portion 26 for front seat and the inflation portion 27 for rear seat are divided by below-described division portions 37 and 38, and the inflation portion 26 for front seat and the inflation portion 27 for rear seat are regulated in thickness at the time of completion of inflation. In detail, the inflation portion 26 for front seat has four vertical cells 26a, 26b, 26c, and 26d placed in line from the front to the rear. The inflation portion 27 for rear seat has two vertical cells 27a and 27b placed in line from the front to the rear. The vertical cells 26a, 26b, 26c, 26d, 27a, and 27b are configured to respectively inflate in rod shapes along a vertical direction at the time of completion of inflation of the airbag body 20.

In the airbag body 20 of the embodiment, the vertical cell 26a arranged on the front end side of the inflation portion 26 for front seat configures the end side inflation portion 29 arranged on the front end side of the airbag body 20. In the gas inflow portion 21 of the airbag body 20, a portion other than the vertical cell 26a configures the general inflation section 30. The end side inflation portion 29 has a configuration in which an upper end 29a side thereof communicates with the gas guide flow channel 23 and the inflation gas flows in from the upper end 29a side. The end side inflation portion 29 is divided from the adjacent vertical cell 26b configuring the general inflation section 30 by a division portion 37A throughout a lower end 29b side, excluding the upper end 29a side. That is, the end side inflation portion 29 is occluded on the lower end 29b side. The end side inflation portion 29 has a substantially uniform width dimension on the front-rear direction side throughout the entire vertical region. In other words, the end side inflation portion 29 is configured to cause the lower end 29b side to be positioned on the front side which is closer to the end edge side than a below-described slit 41 in the front-rear direction.

The non-inflow portion 33 includes the attachment portions 35, a peripheral edge portion 34, the division portions 37 and 38, and a plate-shaped portion 39.

Figure 4:
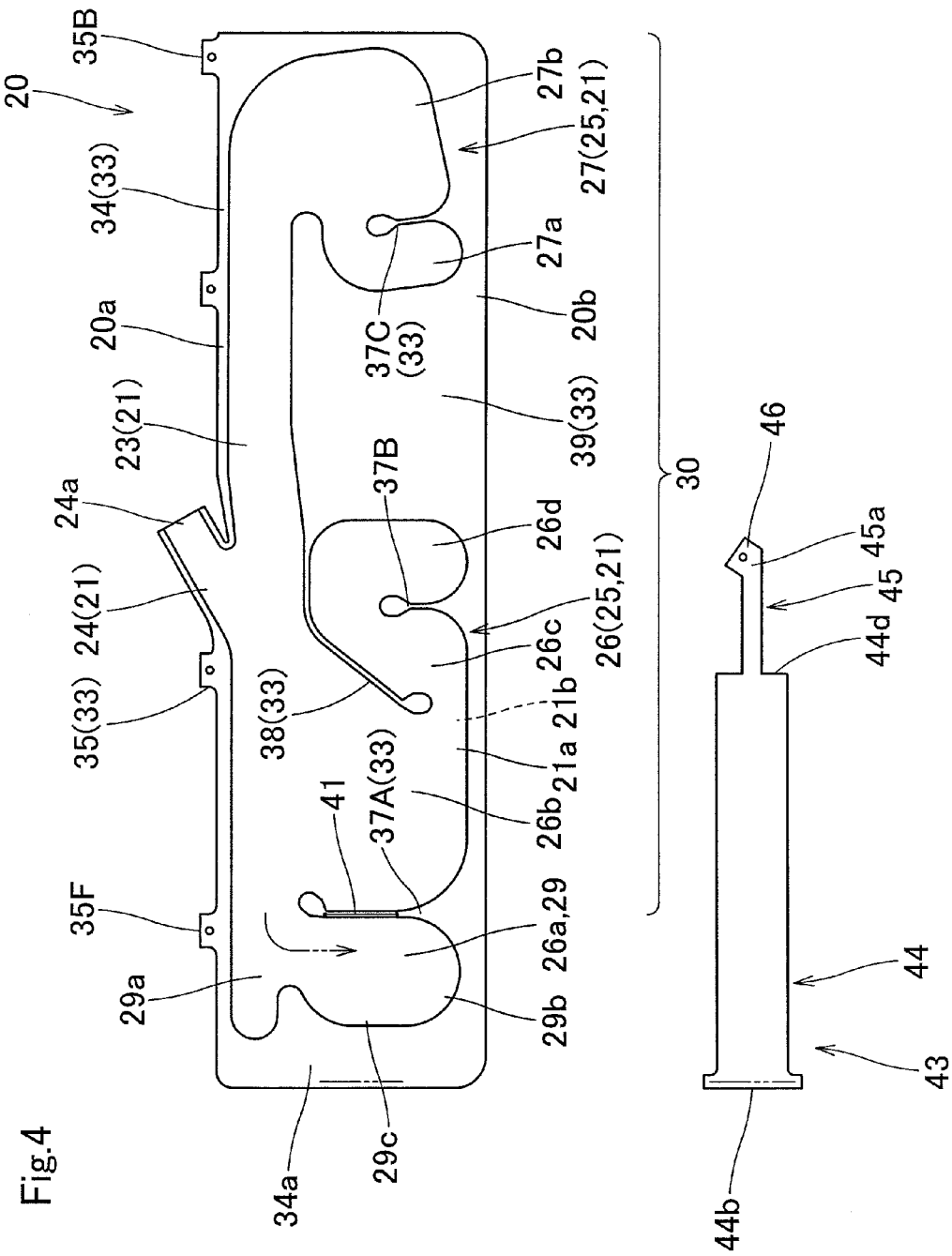
FIG. 4 is a front view illustrating a state where an airbag body and a tension cloth of the airbag in FIG. 2 are put side by side.

The peripheral edge portion 34 is a portion configuring the outer peripheral edge of the airbag body 20. The peripheral edge portion 34 is formed to surround the gas inflow portion 21 throughout the entire peripheral edge thereof, excluding the rear end 24a side of the gas inflow port portion 24. The attachment portion 35 are portions for attaching the upper edge 20a side of the airbag body 20 (airbag 19) to the inner panel 2 on the body 1 side. As illustrated in FIGS. 2 and 4, a plurality of the attachment portions 35 are arranged along the front-rear direction so as to protrude upward from a portion on the upper edge side of the peripheral edge portion 34. In the embodiment, four attachment portions 35 are arranged. In each attachment portion 35, an attachment hole 35a through which the attachment bolt 12 can be inserted is formed. In the airbag 19 of the embodiment, a front side attachment portion 35F which is arranged on the front end side among the attachment portions 35 is the portion to which a portion on the end side inflation portion 29 side of the upper edge 20a side in the airbag body 20 is attached. The front side attachment portion 35F (end side attachment portion) is arranged at a position farther rearward close to a central side of the airbag body 20 in the front-rear direction than a front edge 29c of the end side inflation portion 29. Specifically, the front side attachment portion 35F (end side attachment portion) is arranged at a position farther rearward from the middle of the front to the rear in the end side inflation portion 29. More specifically, the front side attachment portion 35F (end side attachment portion) is arranged at a farther frontward side position than the division portion 37A which is arranged on a rear side of the end side inflation portion 29 (refer to FIGS. 2 and 4).

The division portions 37 and 38 are respectively arranged inside the regions of the inflation portion 26 for front seat and the inflation portion 27 for rear seat. The division portions 37 and 38 are the portions to respectively divide the inner regions of the inflation portion 26 for front seat and the inflation portion 27 for rear seat into a plurality of the vertical cells 26a, 26b, 26c, 26d, 27a, and 27b. The division portions 37A, 37B, and 37C are formed substantially along the vertical direction so as to extend upward from the lower edge side of the peripheral edge portion 34. The division portion 38 is formed so as to extend downward to the front from the upper front end of the plate-shaped portion 39. The slit 41 is formed along the vertical direction in the division portion 37A which divides the vertical cells 26a and 26b (refer to FIG. 4). The slit 41 is a portion through which a below-described support portion 44 of the tension cloth 43 is inserted. Specifically, the slit 41 is arranged at a position upwardly away from the lower edge of the end side inflation portion 29 so as to partially divide the end side inflation portion 29 and the general inflation section 30 at a vertically intermediate portion. In the embodiment, the slit 41 is arranged at a vertically substantially middle position in the airbag body 20. The plate-shaped portion 39 is arranged at a position below the gas guide flow channel 23 between the inflation portion 26 for front seat and the inflation portion 27 for rear seat. The plate-shaped portion 39 has substantially rectangular shape.

The tension cloth 43 is made with woven fabric such as polyamide yarns, polyester yarns, or the like. The tension cloth 43 allows the base portion side to be joined to the front end side of the airbag body 20 and allows the leading end side to be fixed to the body 1 side of the vehicle V on the front edge side of the window W1 away from the front end of the airbag body 20. The tension cloth 43 is arranged substantially along the front-rear direction at the time of completion of inflation of the airbag 19. In the embodiment, as illustrated in FIGS. 2 to 4, the tension cloth 43 includes the belt-shaped support portion 44 arranged on the base portion side, and a belt portion 45 extending forward from a leading end 44d side of the support portion 44. The support portion 44 is arranged so as to cover the outer peripheral side of the end side inflation portion 29. The belt portion 45 has a narrower width than that of the support portion 44. In the embodiment, the support portion 44 is set to have the width dimension of approximately one-fourth the vertical width dimension of the airbag body 20. The belt portion 45 is arranged so as to protrude forward from the leading end 44d side of the support portion 44, thereby causing the vertically middle portion thereof to substantially match the vertically middle portion of the support portion 44. The tension cloth 43 is attached to the airbag body 20 as follows. Initially, a base portion side portion 44a of the support portion 44 in which a base portion end 44b is arranged to be oriented forward is arranged so as to cover the inner vehicle side I of the end side inflation portion 29. In this state, the base portion end 44b of the support portion 44 is sewed (joined) to a front edge side portion 34a of the peripheral edge portion 34 (the front edge 29c side of the end side inflation portion 29), using sewing thread. Subsequently, a leading end side portion 44c in the support portion 44 is inserted into the slit 41 which is formed in the division portion 37A and is inverted so as to cover the outer vehicle side O of the end side inflation portion 29. In this manner, the support portion 44 of the tension cloth 43 covers the outer peripheral side of the end side inflation portion 29 throughout the substantially the entire periphery (refer to FIG. 3). In the belt portion 45 protruding from the leading end 44d side of the support portion 44, the attachment portion 46 which is fixedly attached onto the body 1 side of a vehicle is formed on the leading end 45a side away from the support portion 44. The attachment portion 46 uses the attachment bracket 11 and the attachment bolt 12 to be fixedly attached to the inner panel 2 of the body 1 side of a vehicle, similar to the case of the attachment portions 35 of the airbag body 20 (refer to FIG. 7). The attachment portion 46 is fixedly attached to a portion of the front pillar portion FP which is lower than the portion of the roof side rail portion RR which becomes the upper edge side of the windows W1 and W2 to which the attachment portion 35s of the airbag body 20 are fixedly attached, in the inner panel 2.

Figure 5:
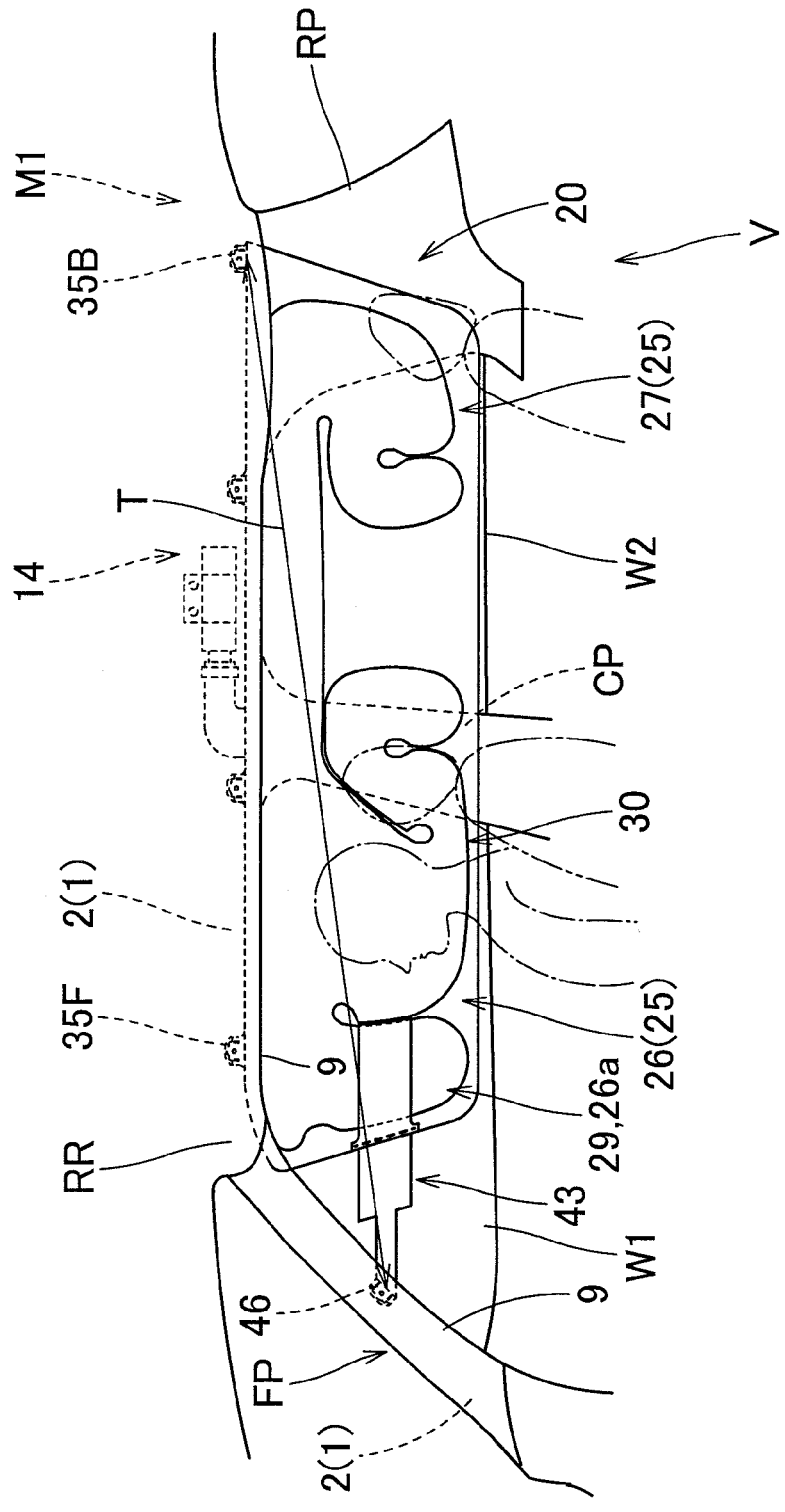
FIG. 5 is a schematic front view of a state where the airbag is completely inflated in the head protection airbag apparatus according to the first embodiment, seen from the inner vehicle side.

In the airbag 19 of the embodiment, at the time of completion of inflation mounted on the vehicle, the vertical cells 26b, 26c, 26d, 27a, and 27b configuring the general inflation section 30 in the inflation portion 26 for front seat and the inflation portion 27 for rear seat inflate so as to contract the width dimension in the front-rear direction from a non-inflation state. Therefore, at the time of inflation of the airbag 19, as illustrated in FIG. 5, a tension T substantially along the front-rear direction is generated between the attachment portion 46 formed in the tension cloth 43 and a rear side attachment portion 35B arranged on the rear end side of the airbag body 20. In other words, in the airbag 19 of the embodiment, at the time of completion of inflation, the leading end side portion 44c (a portion on the belt portion 45 side) arranged on the outer vehicle side of the end side inflation portion 29 in the support portion 44 of the tension cloth 43, and a portion of the general inflation section 30 arranged on the rear side of the end side inflation portion 29 in the airbag body 20 are arranged substantially along the front-rear direction (refer to FIG. 7).

Subsequently, description will be given regarding the mounting of the head protection airbag apparatus M1 in the first embodiment into the vehicle V. Initially, the airbag 19 is folded. Specifically, the airbag body 20 in a state where the inner vehicle side wall portion 21a and the outer vehicle side wall portion 21b overlap each other to be flatly deployed is folded along with the support portion 44 of the tension cloth 43 so as to cause a lower edge 20b side to approach the upper edge 20a side, thereby contracting the width dimension in the vertical direction. After completing the folding of the airbag 19 in such a manner, a predetermined place for the airbag 19 is wrapped by using a tearable wrapping material for preventing a folding collapse (not illustrated).

Thereafter, the inflator 14 to which the attachment bracket 15 has attached is connected to the gas inflow port portion 24 of the airbag 19, utilizing the clamp 17. The attachment brackets 11 are fixedly attached to the attachment portion 46 of the tension cloth 43 and each of the attachment portions 35 of the airbag body 20, thereby forming an airbag assembly.

Subsequently, the attachment brackets 11 and 15 are arranged at predetermined positions of the inner panel 2 of the body 1 side, thereby being bolted with the bolts 12 and 16. A lead wire (not illustrated) extending from a predetermined control circuit for operating the inflator is wired to the inflator 14. The front pillar garnish 4 and the roof head lining 5 are attached to the body 1. When a center pillar garnish 6 and a rear pillar garnish 7 are attached to the body 1, the head protection airbag apparatus M1 can be mounted on the vehicle V.

When the inflator 14 operates after mounting the head protection airbag apparatus M1 on the vehicle V, the inflation gas discharged from the inflator 14 flows into the airbag body 20, as illustrated in FIG. 2. The inflating airbag body 20 tears the wrapping material (not illustrated) and pushes and opens the airbag cover 9 formed from the lower edges of the front pillar garnish 4 and the roof head lining 5, thereby protruding downward. As illustrated in FIG. 5, the airbag body 20 significantly inflates so as to cover the inner vehicle side of the windows W1 and W2, the center pillar portion CP, and the rear pillar portion RP.

In the head protection airbag apparatus M1 of the first embodiment, at the time of completion of inflation of the airbag body 20, when the tension T substantially in the tension cloth 43 along the front-rear direction is generated (refer to FIG. 5), the end side inflation portion 29 exhibits an aspect of thrusting out toward the inner vehicle side I by the leading end side portion 44c in the support portion 44 of the tension cloth 43, thereby protruding to the inner vehicle side I. In this case, the end side inflation portion 29 is bent at the division portion 37A as a starting point and smoothly and significantly thrusts out toward the inner vehicle side I along the horizontal direction. This is because the end side inflation portion 29 is likely to move with respect to the general inflation section 30, since the end side inflation portion 29 is partially divided from the general inflation section 30 arranged on the rearward side which becomes the central side in the front-rear direction due to the slit 41 through which the support portion 44 of the tension cloth 43 formed in the division portion 37A is inserted.

Figure 6A:
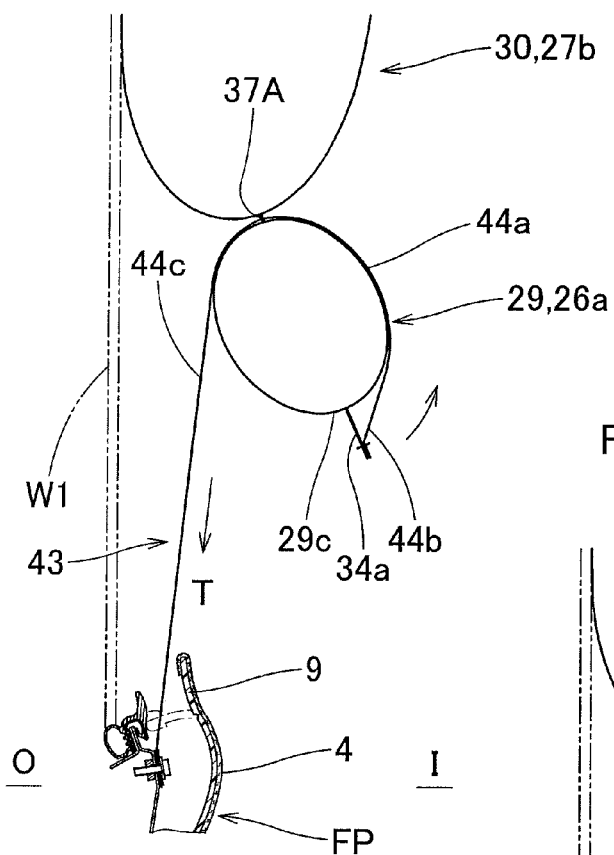
FIGS. 6A and 6B are schematic cross-sectional views along a front-rear direction illustrating a process in which an end side inflation portion protrudes toward the inner vehicle side at the time of completion of inflation of the airbag in the head protection airbag apparatus according to the first embodiment.
Figure 6B:
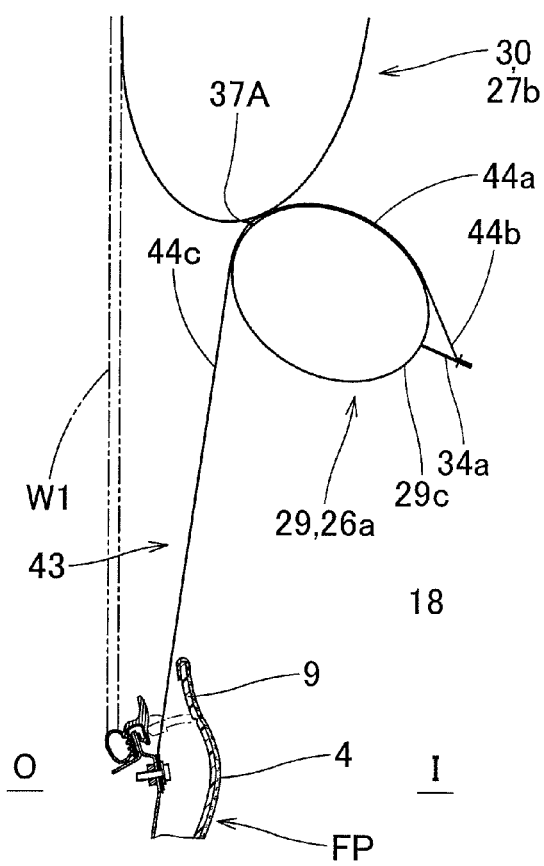

In the head protection airbag apparatus M1 of the first embodiment, the tension cloth 43 allows the base portion end 44b of the support portion 44 to be joined to the front edge 29c side on the inner vehicle side I of the end side inflation portion 29 and is inverted via the slit 41 formed in a portion of the division portion 37A which divides the end side inflation portion 29 from the general inflation section 30. In other words, the support portion 44 is arranged so as to wrap around the outer peripheral surface of the end side inflation portion 29 from the inner vehicle side I to the outer vehicle side O. The leading end 45a side of the belt portion 45 extending from the leading end 44d side of the support portion 44 is fixed to the body 1 side of the vehicle V. Therefore, at the time of completion of inflation of the airbag body 20, when the tension T substantially in the tension cloth 43 along the front-rear direction is generated, upon the reception of the tension T, as illustrated in FIG. 6A, the tension cloth 43 causes the base portion side portion 44a of the support portion 44 fixed to the front edge 29c side of the end side inflation portion 29 to be separated from the belt portion 45 side which becomes the leading end side while being in a stretched state so as to be oriented toward the inner vehicle side I. Then, upon the reception of such a tension T, the front edge 29c side of the end side inflation portion 29 connected to the base portion end 44b of the support portion 44 in the tension cloth 43 is oriented significantly toward the inner vehicle side I (refer to FIGS. 6B and 7). The end side inflation portion 29 is divided from the general inflation section 30 by the division portion 37A arranged substantially along the vertical direction and forms a inflation portion substantially along the vertical direction, thereby completing the inflation. In other words, the end side inflation portion 29 is completely inflated in a rod shape substantially along the vertical direction. Therefore, at the time of completion of inflation of the airbag 19, the end side inflation portion 29 significantly thrusts out toward the inner vehicle side I by the tension cloth 43 throughout a vertically wide range.

As a result, the head protection airbag apparatus M1 of the first embodiment, at the time of completion of inflation of the airbag 19, the end side inflation portion 29 which is arranged to protrude toward the inner vehicle side I so as to cause the front edge 29c side to be oriented significantly toward the inner vehicle side I is arranged to face an occupant MP in the diagonally front of the occupant MP (refer to FIG. 7). Therefore, at the time of a diagonal collision, a head MH of the occupant MP moving diagonally forward to the outer vehicle side can be invariably protected by the end side inflation portion 29 which is completely inflated.

Therefore, in the head protection airbag apparatus M1 of the first embodiment, at the time of completion of inflation of the airbag 19, the end side inflation portion 29 can significantly protrude toward the inner vehicle side I by the tension cloth 43, and the head MH of the occupant MP can also be invariably protected at the time of a diagonal collision.

Particularly, in the head protection airbag apparatus M1 of the first embodiment, the vertical cell 27a configuring the end side inflation portion 29 communicates with the general inflation section 30 only with a portion on the upper end 29a side. In other words, the portion excluding the upper end 29a side of the end side inflation portion 29 is divided from the general inflation section 30 by the division portion 37A. In other words, in the head protection airbag apparatus M1 of the first embodiment, the end side inflation portion 29 is occluded on the lower end 29b side. Therefore, at the time of completion of inflation of the airbag 19, the end side inflation portion 29 can smoothly thrust out toward the inner vehicle side throughout a substantially entire region in the vertical direction by the leading end side portion 44c in the support portion 44 of the tension cloth 43. If the protruding of the end side inflation portion toward the inner vehicle side is not significantly hindered, the lower end side of the end side inflation portion may communicate with the general inflation section.

Additionally, in the head protection airbag apparatus M1 of the first embodiment, the end side inflation portion 29 allows the lower end 29b side to be positioned closer to the front side than the slit 41. Therefore, at the time of completion of inflation of the airbag body 20, the end side inflation portion 29 can cause the entire region throughout the lower end 29b side in the vertical direction to be smoothly bent at a portion in the division portion 37A as a starting point where the slit 41 is arranged. As a result, the entire region on the lower end 29b side of the end side inflation portion 29 can smoothly and significantly thrust out toward the inner vehicle side by the tension cloth 43 with no difficulty.

In the head protection airbag apparatus M1 of the first embodiment, the tension cloth 43 is arranged at a substantially middle position in the vertical direction upwardly away from the lower edge (lower end 29b) of the end side inflation portion 29 at the time of completion of inflation. Therefore, compared to a case where the tension cloth is arranged on the lower edge side of the end side inflation portion so as to increase the separation distance from the fixing point on the upper edge side, it is possible to secure a great amount of protrusion of a portion on the lower end 29b side of the end side inflation portion 29 toward the inner vehicle side I (refer to FIG. 7), since the upper edge 20a side of the airbag body 20 is fixed to the body 1 side. This is because, when it is configured to be as the embodiment, even though the portion itself of the end side inflation portion 29 at the arrangement position of the tension cloth 43 has the amount of protrusion toward the inner vehicle side equivalent to that in the related art, and the arrangement position of the tension cloth 43 has a short separation distance from the fixing point (attachment portion 35) to the body 1 side. Moreover, this is because, on the lower end 29b side of the end side inflation portion 29 having a long separation distance from the fixing point (attachment portion 35), a great amount of protrusion toward the inner vehicle side I can be secured equivalently to the lengthened portion in direct proportion thereto. Accordingly, the tension cloth 43 is arranged in the vertically intermediate portion upwardly away from the lower edge (lower end 29b) of the end side inflation portion 29, and thus, at the time of completion of inflation of the airbag 19, a portion on the lower end 29b side of the end side inflation portion 29 can invariably and significantly protrude toward the inner vehicle side I. Therefore, it is possible to invariably receive the head of an occupant moving downward while moving diagonally forward at the time of a diagonal collision with a portion on the lower end 29b side of the end side inflation portion 29 significantly protruding toward the inner vehicle side I. Naturally, if such a respect is not taken into consideration, the tension cloth may be configured to be arranged in a portion in the vicinity of the lower edge of the end side inflation portion.

In the head protection airbag apparatus M1 of the first embodiment, the end side attachment portion (front side attachment portion) 35F which fixes the upper edge side of the end side inflation portion 29 to the body 1 side of the vehicle V is arranged on the farther rearward side which becomes the central side of the airbag body 20 in the front-rear direction than the front edge 29c side of the end side inflation portion 29. In other words, in the head protection airbag apparatus M1 of the embodiment, the front side attachment portion (end side attachment portion) 35F which becomes the fixing point with respect to the body 1 side is positioned closer to the central side in the front-rear direction than the front edge 29c of the end side inflation portion 29. Therefore, at the time of completion of inflation of the airbag 19, it is possible to increase the length of the portion on the front edge 29c of the end side inflation portion 29 stretched toward the inner vehicle side I equivalently to a separation distance L1 (refer to FIG. 2) on the front-rear direction side (horizontal direction side) from the front edge 29c side of the front side attachment portion 35F. As a result, the front edge 29c side of the end side inflation portion 29 can more significantly protrude toward the inner vehicle side I along the horizontal direction. Naturally, if such a respect is not taken into consideration, the end side attachment portion may be configured to be arranged at a position immediately above the end edge of the end side inflation portion.

Figure 9:
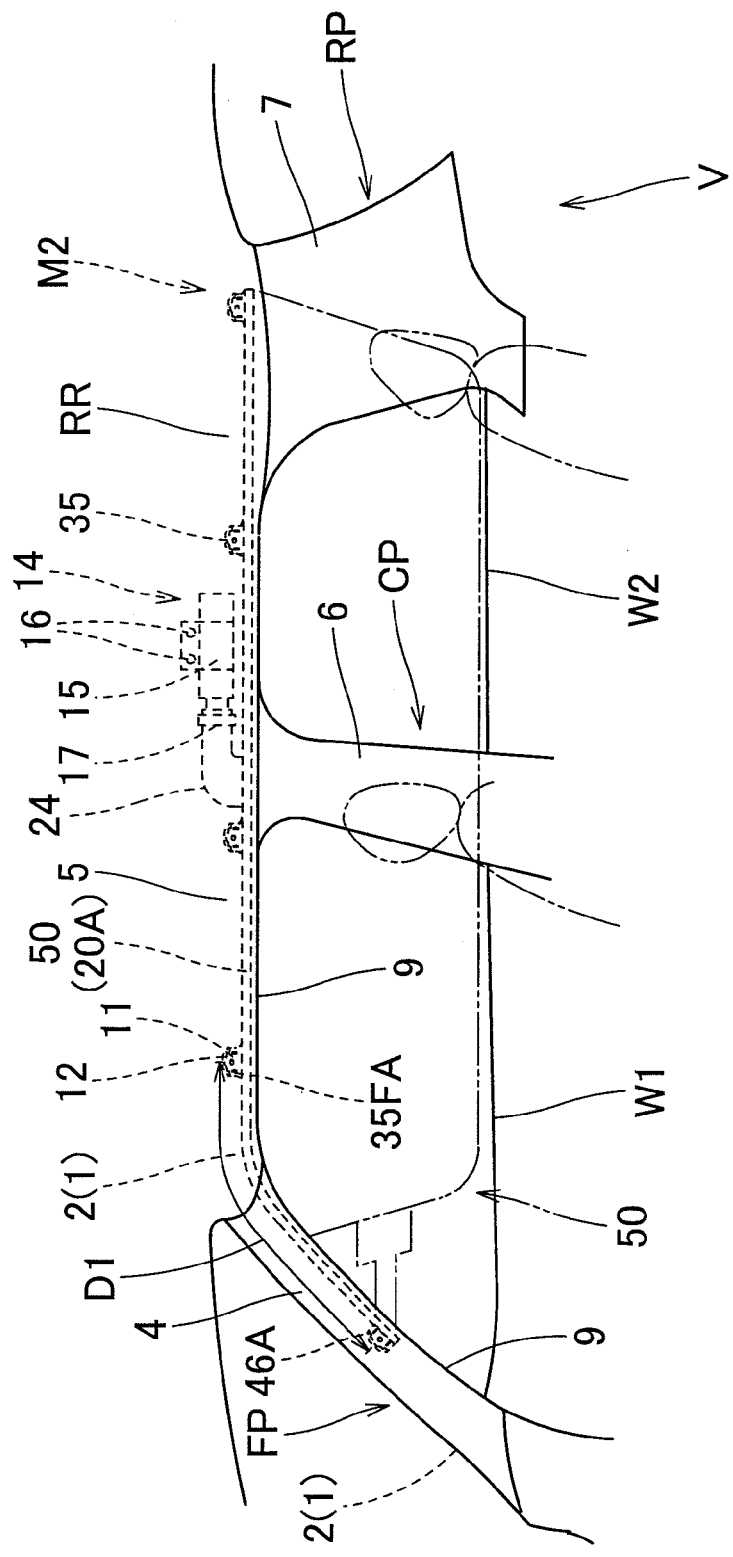
FIG. 9 is a schematic front view of the head protection airbag apparatus according to a second embodiment of the present invention, seen from the inner vehicle side.
Figure 12:
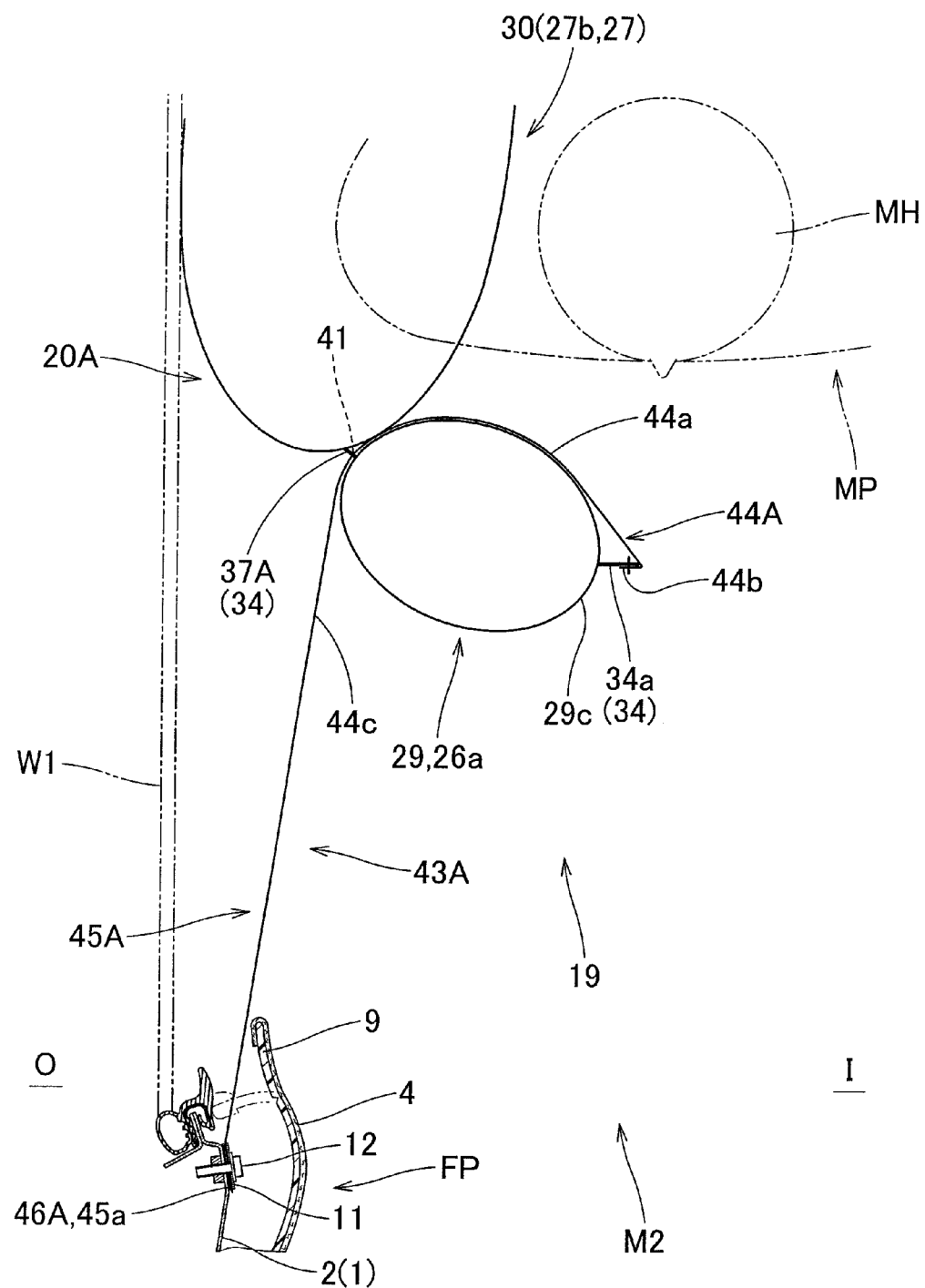
FIG. 12 is a schematic cross-sectional view along the front-rear direction illustrating a state where the airbag is completely inflated in the head protection airbag apparatus according to the second embodiment.

Subsequently, a head protection airbag apparatus M2 according to a second embodiment of the invention will be described. In the head protection airbag apparatus M2 of the second embodiment, as illustrated in FIGS. 9 and 12, the members other than an airbag 50 have the same configuration as in the head protection airbag apparatus M1 of the first embodiment. Therefore, the same reference numerals and signs are applied to the same members, and detailed description thereof will be omitted.

Figure 10:
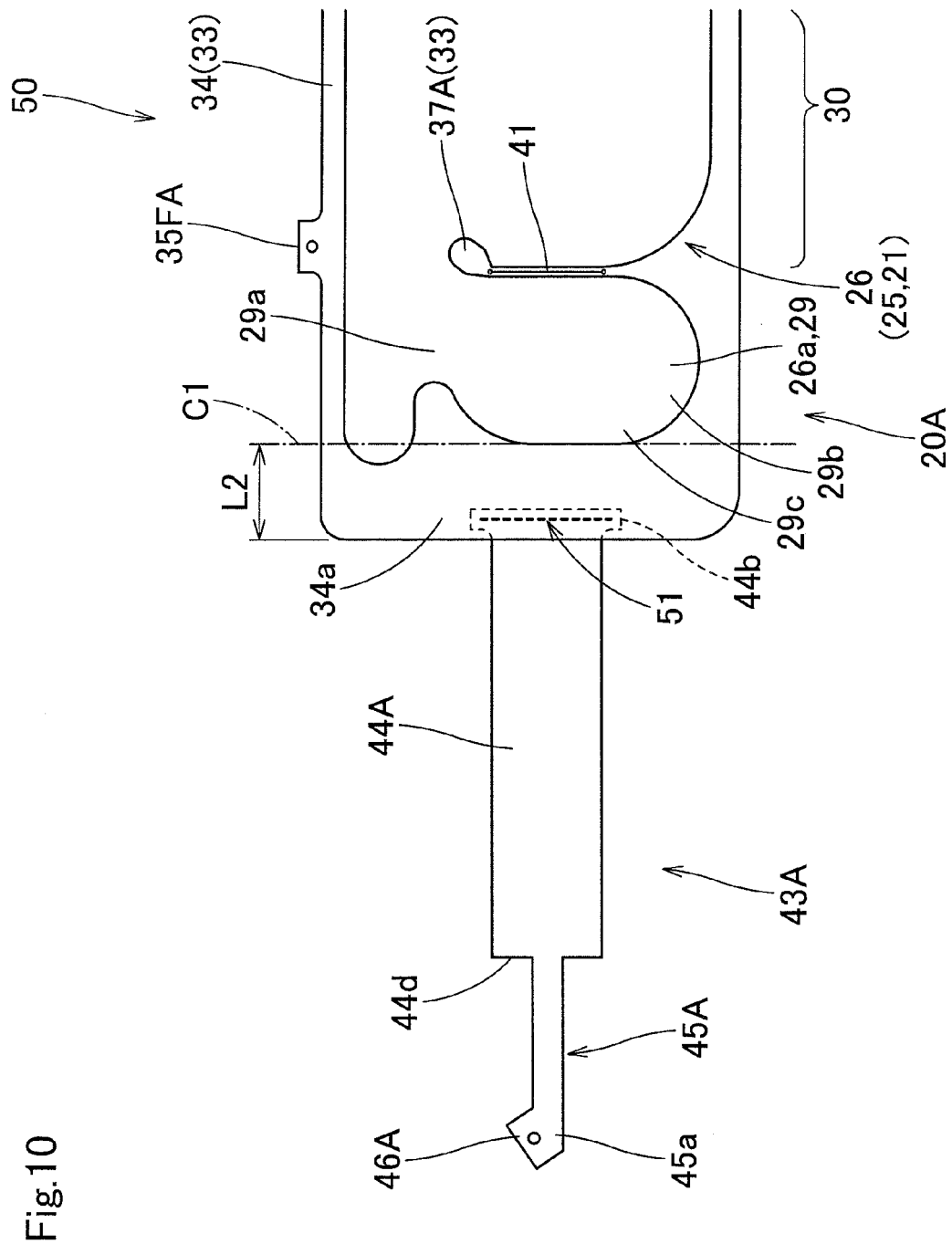
FIG. 10 is a partially enlarged front view illustrating a state where the airbag used in the head protection airbag apparatus according to the second embodiment is flatly deployed so as to extend the tension cloth to the front of the airbag body.
Figure 11:
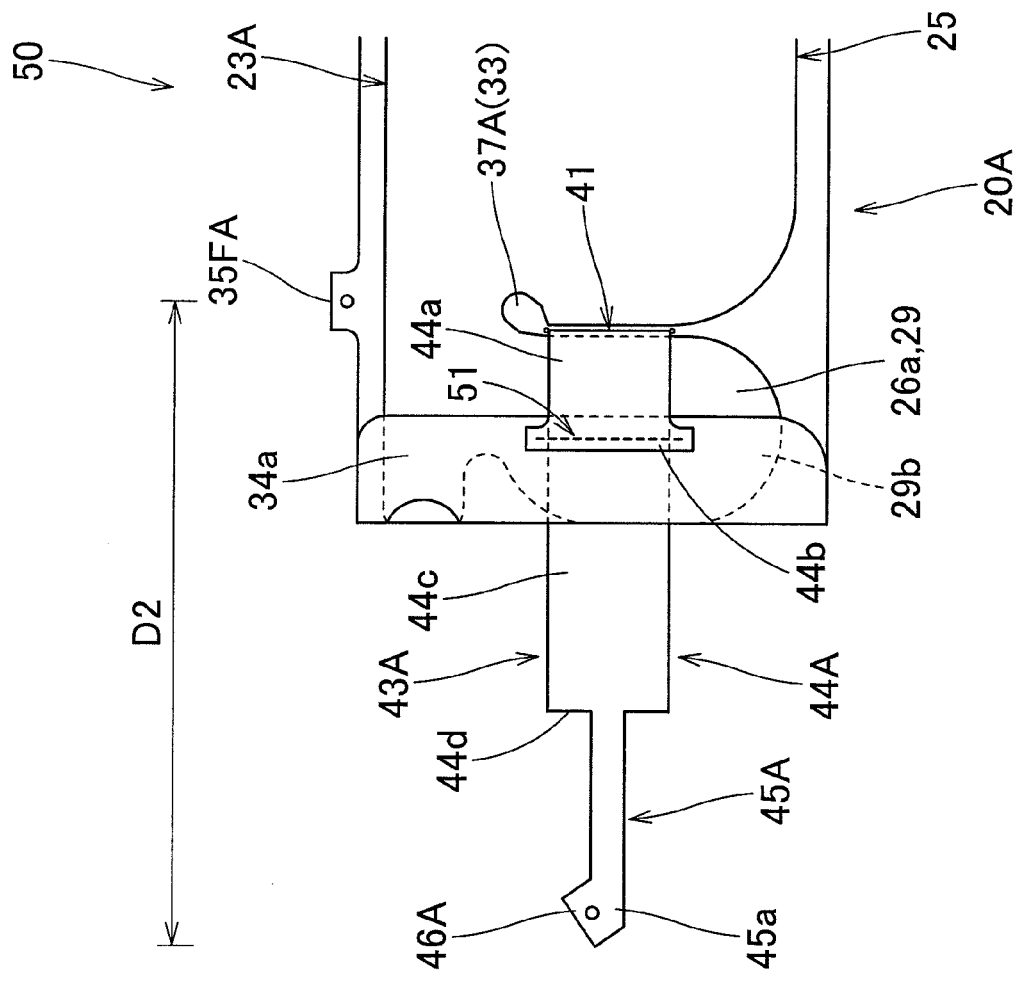
FIG. 11 is a partially enlarged front view illustrating a state where the tension cloth is arranged so as to cover an outer peripheral side of the folded-back end side inflation portion in the airbag in FIG. 10.

As illustrated in FIGS. 10 and 11, the airbag 50 used in the head protection airbag apparatus M2 of the second embodiment includes an airbag body 20A and a tension cloth 43A which is joined to the front end side of the airbag body 20A. The airbag body 20A has the same configuration as the above-described airbag body 20 other than that a front side attachment portion 35FA (end side attachment portion). The front side attachment portion 35FA is arranged on the front side is arranged at a position farther rearward than the slit 41. Therefore, the same reference numerals and signs are applied to the same members, and detailed description thereof will be omitted. In detail, the front side attachment portion 35FA is in an upper portion on the rearward side of the division portion 37A including the slit 41 and is formed so as to be adjacent to the division portion 37A. The tension cloth 43A has the same configuration as the tension cloth 43 of the above-described airbag 19 other than that the length dimension is different. Therefore, the alphabetic sign "A" is added to the end of the same reference numerals and signs for the same members, thereby omitting the detailed description.

In the airbag 50, as illustrated in FIG. 10, the tension cloth 43A allows the base portion side to be joined to the front end side of the end side inflation portion 29 so as to cause a belt portion 45A which becomes the leading end side to be oriented toward a direction side (front side) separated from the airbag body 20A in a state before inversion. In other words, the tension cloth 43A has an attachment direction toward the airbag body 20A opposite to the airbag 19 used in the first embodiment. In detail, the tension cloth 43A allows the base portion end 44b of a support portion 44A in which the base portion end 44b is arranged so as to be oriented toward the rear and sewed to the front edge side portion 34a (the front edge 29c side of the end side inflation portion 29) in the peripheral edge portion 34 at a joining portion 51, using sewing thread. In the embodiment, the tension cloth 43A is connected to the airbag body 20A so as to overlap the outer vehicle side of the airbag body 20A in a flatly deployed state. In the airbag 50, initially, a portion on the front edge 29c side of the end side inflation portion 29 is folded back at a folding line C1 (refer to FIG. 10) substantially along the vertical direction so as to be oriented toward the inner vehicle side I in the airbag body 20A. The tension cloth 43A is inverted so as to cause the belt portion 45A to be oriented toward the rear side while maintaining a state of extending rearward from the joining portion 51. The leading end side portion 44c in the support portion 44A of the tension cloth 43A is inserted through the slit 41, and the leading end side portion 44c is inverted again so as to cover the outer vehicle side O of the end side inflation portion 29. In this manner, as illustrated in FIG. 11, the outer peripheral side of the end side inflation portion 29 can be covered throughout the substantially the entire periphery by the support portion 44A. In other words, in the airbag 50, the support portion 44A of the tension cloth 43A is arranged so as to extend toward the rear from the front edge 29c of the end side inflation portion 29 which is folded back toward the inner vehicle side I, and is inverted via the slit 41, thereby covering the outer peripheral side of the end side inflation portion 29. In the embodiment, as illustrated in FIG. 10, the folding line C1 at which the airbag body 20A is folded back is formed inside a region of the front edge side portion 34a in the peripheral edge portion 34. In detail, the folding line C1 is formed in the vicinity of a boundary portion with respect to the end side inflation portion 29.

In the head protection airbag apparatus M2 of the second embodiment, the airbag body 20A maintaining the folded-back state of the front edge side is folded so as to contract the vertical width dimension along with the support portion 44A of the tension cloth 43A so that the lower edge 20b side approaches the upper edge 20a side, and then, the airbag 50 is folded to be mounted on the vehicle V. In the embodiment, a region of the protection inflation portion 25 in the airbag body 20A is folded in a rolling fold manner so as to roll to the outer vehicle side by its lower edge (not illustrated in detail). In the airbag body 20A, a region of the gas guide flow channel 23 of the protection inflation portion 25 on the upper side is folded like an accordion having folding lines along the front-rear direction.

In the head protection airbag apparatus M2 of the second embodiment, the practical length dimension of the tension cloth 43A on the front-rear direction side extending from the end edge (front edge side portion 34a) side which is folded back in the airbag body 20A can be set to be small. This is because the end edge side of the airbag body 20A is folded back, and the tension cloth 43A is arranged so as to extend toward the rear from the joining portion 51 to the airbag body 20A. Specifically, in the head protection airbag apparatus M2 of the second embodiment, compared to the tension cloth 43 of the airbag 19 used in the above-described head protection airbag apparatus M1 of the first embodiment, the length dimension of the tension cloth 43A can be decreased equivalently to approximately twice a folding back amount L2 (refer to FIG. 9) of the airbag body 20A. Therefore, at the time of completion of inflation of the airbag body 20A, it is possible to generate greater tension in the tension cloth 43A. As a result, as illustrated in FIG. 12, the end side inflation portion 29 can more significantly thrust out toward the inner vehicle side I by the leading end side portion 44c in the support portion 44A of the tension cloth 43A. The front edge side of the airbag body 20A is arranged so as to be oriented toward the inner vehicle side from the beginning of inflation. This is because the airbag body 20A is contracted in the width dimension in the vertical direction to be folded so as to cause the lower edge 20b side to approach the upper edge 20a side in a state where the front edge side is folded back on the inner vehicle side. Therefore, on account of the folding back of the airbag body 20A as well as the tension cloth 43A which can be decreased in the length dimension, the front edge 29c side of the end side inflation portion 29 can be more smoothly oriented significantly toward the inner vehicle side I at the time of completion of inflation. In the head protection airbag apparatus M2 of the second embodiment, even though the tension cloth 43A is shortened in such a manner, it is possible to secure the length of the tension cloth 43A protruding from the airbag body 20A by folding back the end edge side of the airbag body 20A. Therefore, a separation distance D2 (refer to FIG. 11) between an attachment portion 46A of the belt portion 45A on the leading end 45a side and the front side attachment portion 35FA can substantially match a separation distance D1 (refer to FIG. 9) of a portion on the body 1 side to which each of the attachment portions 46A and the front side attachment portion 35FA are attached. As a result, it is possible to attach the folded airbag 50 onto the body 1 side of a vehicle with no difficulty by simply causing the lower edge 20b side to approach the upper edge 20a side to be folded so as to contract the width dimension in the vertical direction.

In the head protection airbag apparatus M2 of the second embodiment, in the tension cloth 43A, the belt portion 45A which becomes the leading end side is oriented toward the front separated from the airbag body 20A in uninverted state. The tension cloth 43A allows the base portion end 44b of a support portion 44A positioned on the rear side is sewed to the front edge side portion 34a (the front edge 29c side of the end side inflation portion 29) in the peripheral edge portion 34, using sewing thread. Therefore, when the airbag body 20A is folded back, by only simply inverting a portion on the base portion side of the tension cloth 43A, it is possible to suppress the portion in the vicinity of the joining portion 51 in which the base portion end 44b side of the tension cloth 43A is joined to the airbag body 20A side from being partially folded and overlapped in multiple layers causing an increase in size. As a result, the airbag 50 can be suppressed from being partially thick, thereby making it possible to be compactly folded. If such a respect is not taken into consideration, similar to the airbag 19 used in the head protection airbag apparatus M1 of the first embodiment, the tension cloth 43 may be attached to the airbag body 20 by sewing the base portion end 44b of the support portion 44 positioned on the front side to front edge side portion 34a so as to cause the belt portion 45 which becomes the leading end side to be oriented toward the rear which becomes airbag body 20 side. When the front edge side of the airbag body 20 of the airbag 19 having such a configuration is folded back to be mounted on a vehicle, a portion in the vicinity of the joining portion is folded and overlapped in three layers.

In the head protection airbag apparatus M2 of the second embodiment, the end side attachment portion (front side attachment portion) 35FA is arranged closer to the rear side which becomes the central side of the airbag body 20A in the front-rear direction than the slit 41. In other words, the end side attachment portion (front side attachment portion) 35FA which becomes the fixing point to the body 1 side is arranged on the rear side deviated from the end side inflation portion 29. Therefore, a region on the upper end 29a side of the end side inflation portion 29 can significantly thrust out toward the inner vehicle side I with no difficulty by the tension cloth 43A. This is because the end side inflation portion 29 is not regulated in moving toward the inner vehicle side I by an end side attachment portion 35FA, at the time of completion of inflation of the airbag body 20A.

Figure 13:
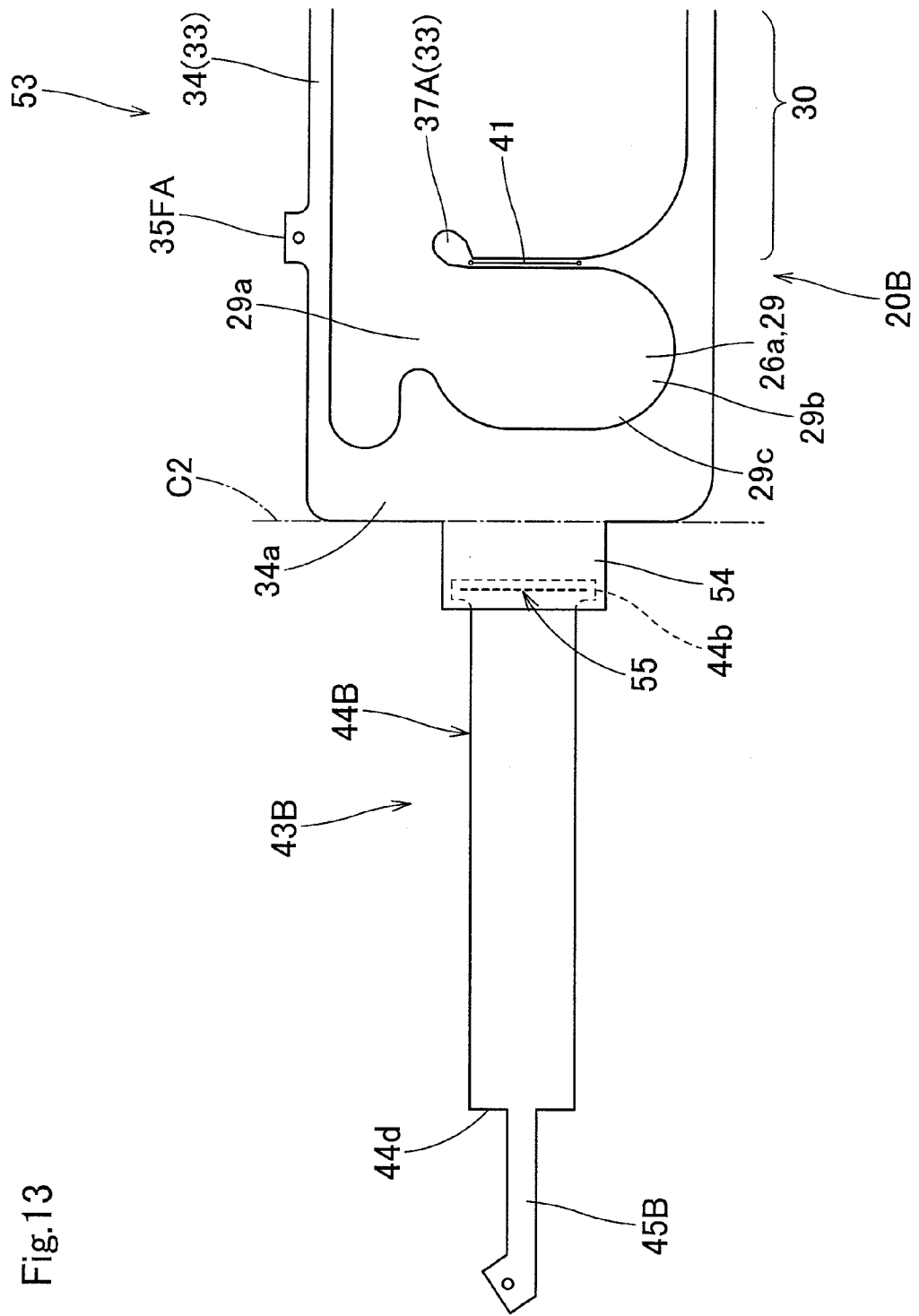
FIG. 13 is a partially enlarged front view illustrating a state where the airbag according to another embodiment of the present invention is flatly deployed so as to extend the tension cloth to the front of the airbag body.
Figure 14:
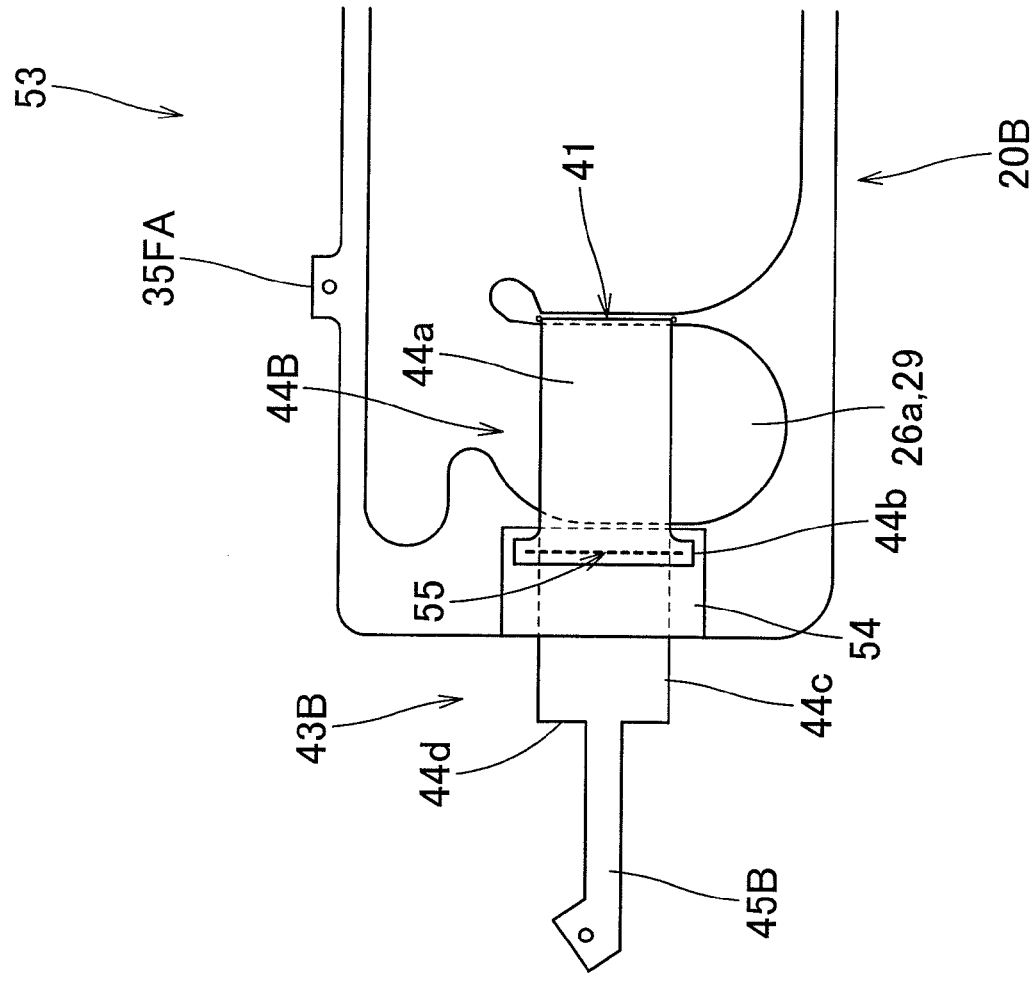
FIG. 14 is a partially enlarged front view illustrating a state where the tension cloth is arranged so as to cover the outer peripheral side of the folded-back end side inflation portion in the airbag in FIG. 13.

An airbag 53 having the configuration illustrated in FIGS. 13 and 14 may be used. In the airbag 53, an airbag body 20B has a protrusion piece portion 54 partially protruding toward the front from the front edge side portion 34a of the peripheral edge portion 34 which becomes the front edge 29c side of the end side inflation portion 29. In the airbag 53, the base portion end 44b of a tension cloth 43B in which a belt portion 45B is arranged so as to be oriented toward the front is sewed to the outer vehicle side of the protrusion piece portion 54. At a portion on the base side which is closer to the central side in the front-rear direction than a joining portion 55 to which the base portion end 44b of the tension cloth 43B is joined, the protrusion piece portion 54 is folded back at a folding line C2 substantially along the vertical direction, and the tension cloth 43B is inverted so as to cause the belt portion 45B to be oriented toward the rear side. The leading end side portion 44c in the support portion 44B of the inverted tension cloth 43B is inserted through the slit 41, and the leading end side portion 44c is inverted again so as to cover the outer vehicle side O of the end side inflation portion 29. In this manner, in the airbag 53, the outer peripheral side of the end side inflation portion 29 is covered throughout the substantially the entire periphery by the support portion 44B. When using the airbag 53 having such a configuration, at the time of folding back, as illustrated in FIG. 14, only the protrusion piece portion 54 is arranged to be folded and overlapped without having a portion of the airbag body on the top and the bottom of the protrusion piece portion 54. Therefore, compared to the airbag 50 in the head protection airbag apparatus M2 of the second embodiment, the portion on the end edge side (front edge side) of the airbag body 20B can be suppressed from being increased in size. As a result, it is possible to more compactly fold the airbag 53. Naturally, in the airbag 53 having such a configuration as well, since the protrusion piece portion 54 is folded back on the inner vehicle side, it is possible to cause the front edge 29c side of the end side inflation portion 29 to be more significantly oriented toward the inner vehicle side I at the time of completion of inflation of the airbag 53.

Figure 15:
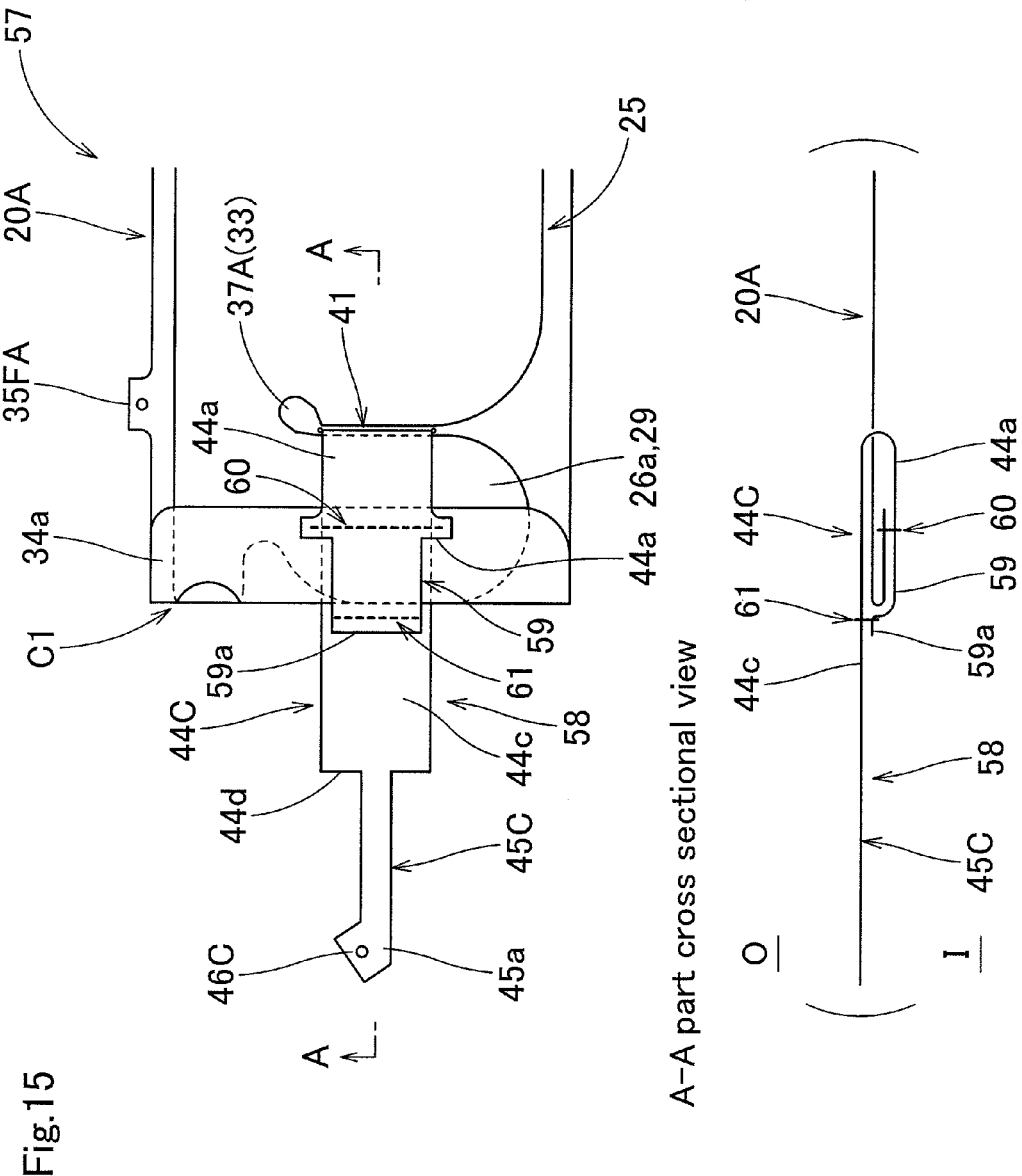
FIG. 15 is a partially enlarged front view illustrating a state where the airbag according to still another embodiment of the present invention is flatly deployed.

An airbag 57 having the configuration illustrated in FIG. 15 may be used. The airbag 57 includes the airbag body 20A and a tension cloth 58 which is joined to the front end side of the airbag body 20A. The airbag body 20A has the same configuration as the airbag body 20A in the above-described airbag 50 of the second embodiment. Therefore, the same reference numerals and signs are applied to the same members, and detailed description thereof will be omitted.

Similar to the tension cloth 43A in the above-described airbag 50, the tension cloth 58 includes a support portion 44C which is arranged so as to extend toward the rear from the front edge 29c of the end side inflation portion 29 which is folded back toward the inner vehicle side I, and a belt portion 45C extending toward the front from the leading end 44d side of the support portion 44C. The tension cloth 58 also includes an extension portion 59 extending toward the front which becomes an attachment portion 46C side that is a fixing portion with respect to the body 1 side for the base portion end 44b of the support portion 44C. Similar to the tension cloth 43A in the above-described airbag 50, the tension cloth 58 allows the base portion end 44b side of the support portion 44C is sewed to a portion of a joining portion 60, using sewing thread so as to cause the base portion end 44b to be oriented toward the rear and to be overlapped on the outer vehicle side of the airbag body 20A. The extension portion 59 has a belt shape so as to extend toward the front from the base portion end 44b of the support portion 44C. The extension portion 59 covers the inner vehicle side of the folded back airbag body 20A (end side inflation portion 29) in a state where the front edge side of the airbag body 20A is folded back on the inner vehicle side. The length dimension of the extension portion 59 is set so as to cause a leading end 59a (front end) to be positioned away to the front from the folding line C1 at which the end side inflation portion 29 is folded back, that is, to be positioned closer to the front than the folded back airbag body 20A. The leading end 59a side of the extension portion 59 is temporarily joined to the leading end side portion 44c (a portion on the attachment portion 46C side fixed to the body 1 side) of the support portion 44C covering the outer vehicle side of the end side inflation portion 29 in the tension cloth 58, using sewing thread. A temporary joining portion 61 at which the leading end 59a side of the extension portion 59 is temporarily joined to the leading end side portion 44c of the support portion 44C is set to have smaller joining strength than the joining portion 60 at which the base portion end 44b of the support portion 44C is joined to the front edge side portion 34a. The temporary joining portion 61 is released from the temporary joined state by causing loosening or tearing of the sewing thread, at the time of deployment and inflation of the airbag 57. Specifically, in the embodiment, the extension portion 59 is formed to have the width dimension narrower than the width of the support portion 44C.

When using the airbag 57 having such a configuration, even though the end edge (front edge) side of the end side inflation portion 29 is folded back, a tension cloth 43C is in a state of integrally protruding from the folded-back end side inflation portion 29 so that favorable folding workability is achieved when folding the airbag body 20A so as to cause the lower edge 20b side to approach the upper edge 20a side. This is because the tension cloth 43C has the extension portion 59 and is temporarily joined to the vicinity of the folding line C1 of the end side inflation portion 29 folded back toward the inner vehicle side by the extension portion 59. The temporary joining portion 61 at which the leading end 59a side of the extension portion 59 is temporarily joined to the leading end side portion 44c which becomes the fixing portion side with respect to the body 1 side in the tension cloth 43C is released from the temporarily joined state at the time of deployment and inflation of the airbag 57. Therefore, despite being joined by the temporary joining portion 61, the airbag 57 can inflate with no difficulty. In the embodiment, the extension portion 59 is formed integrally with the tension cloth 43C so as to extend from the base portion end 44b of the support portion 44C of the tension cloth 43C. Naturally, an extension portion may be formed with a cloth material different from that of the tension cloth.

Figure 16:
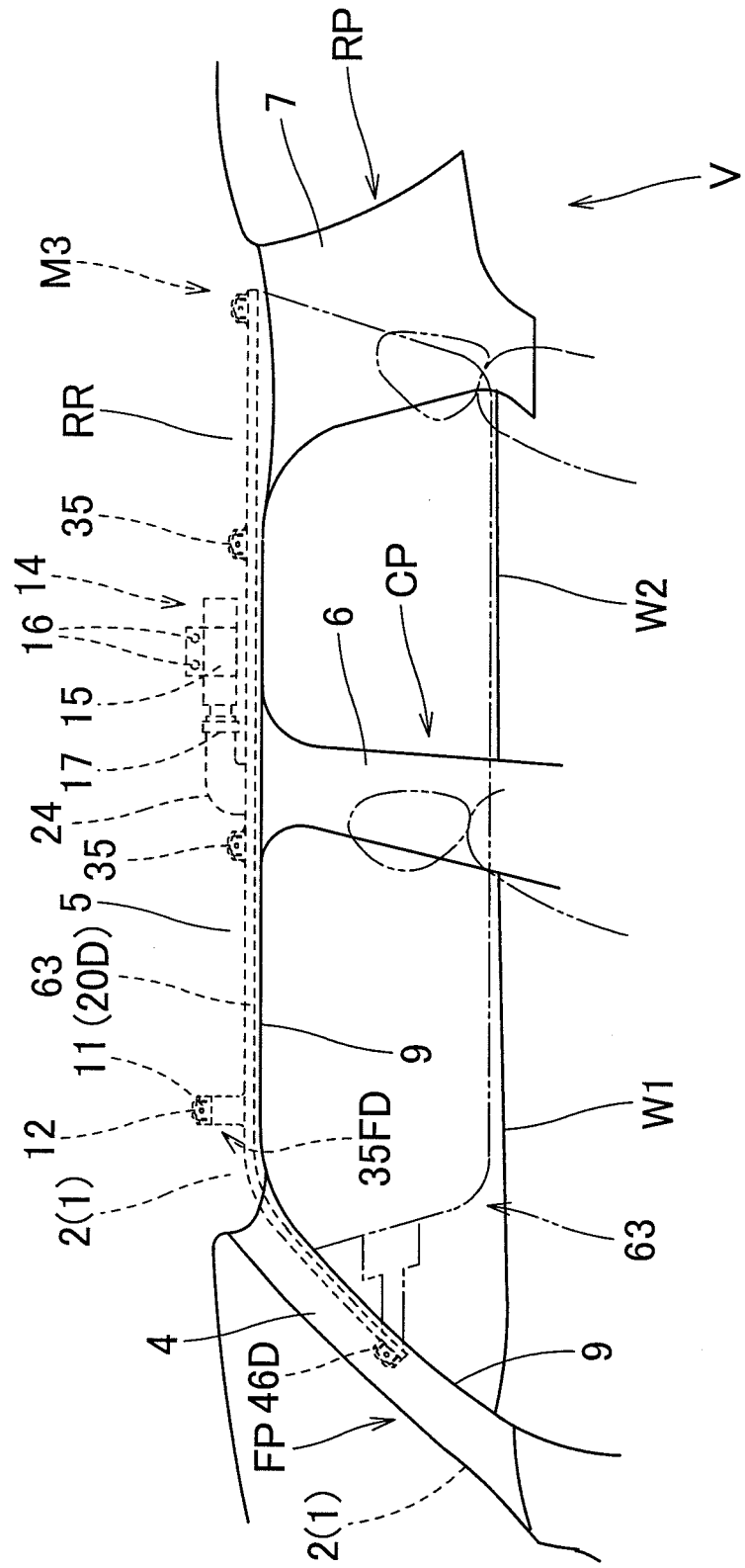
FIG. 16 is a schematic front view of the head protection airbag apparatus according to a third embodiment of the present invention, seen from the inner vehicle side.

Subsequently, a head protection airbag apparatus M3 according to a third embodiment of the invention will be described. In the head protection airbag apparatus M3 of the third embodiment, as illustrated in FIG. 16, the members other than an airbag 63 have the same configurations as in the head protection airbag apparatus M1 of the first embodiment. Therefore, the same reference numerals and signs are applied to the same members, and detailed description thereof will be omitted.

Figure 17:
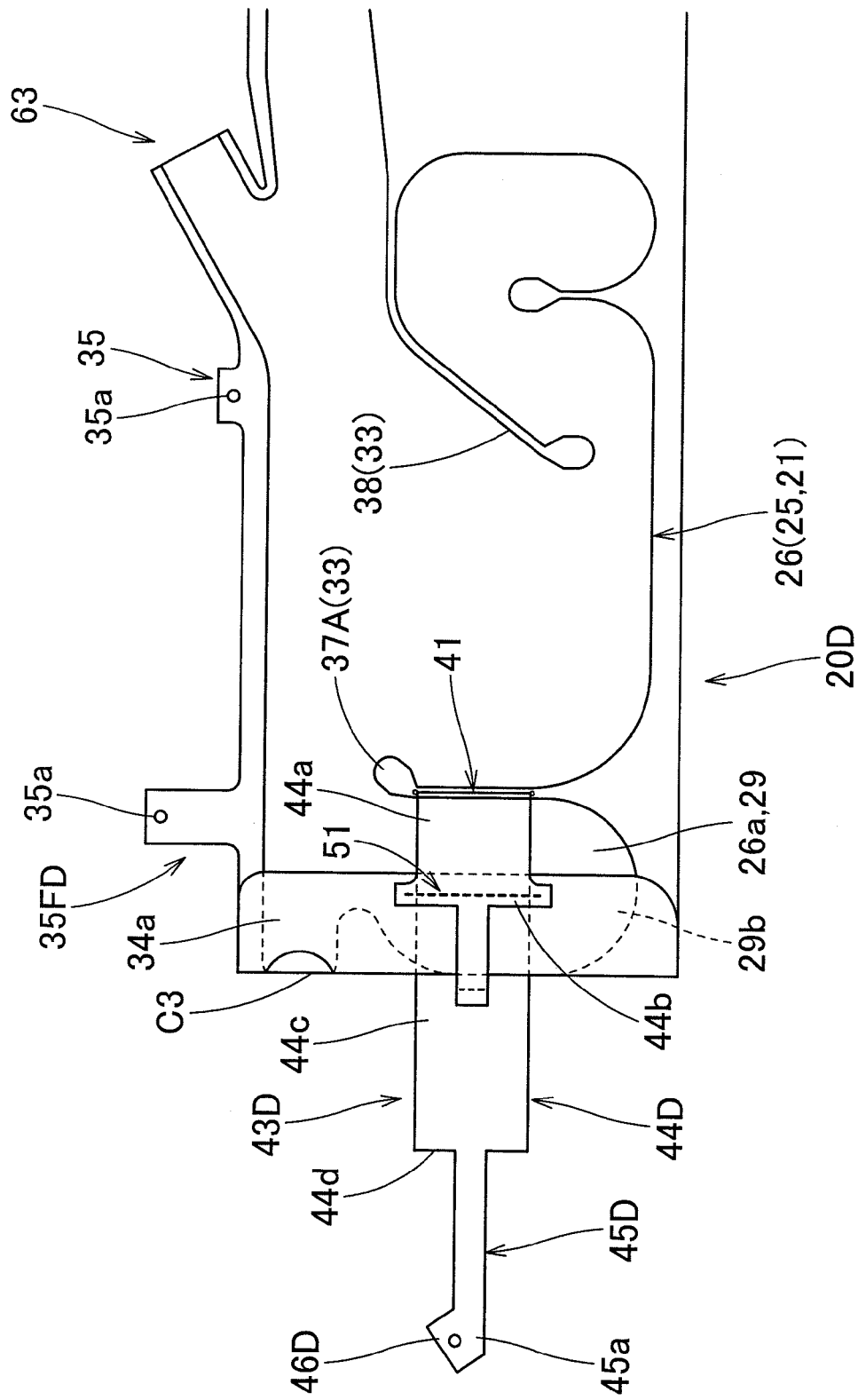
FIG. 17 is a partially enlarged front view illustrating a state where the airbag used in the head protection airbag apparatus according to the third embodiment is flatly deployed.

As illustrated in FIG. 17, the airbag 63 used in the head protection airbag apparatus M3 of the third embodiment includes an airbag body 20D and a tension cloth 43D which is joined to the front end side of the airbag body 20D. The airbag body 20D has an elongated shape so as to extend upward, a front side attachment portion 35FD (end side attachment portion) which is arranged on the front side compared with the front side attachment portion 35F which is formed in airbag body 20 of the first embodiment. In the airbag 63, members other than the front side attachment portion 35FD have the same configurations as the above-described airbag body 20. Therefore, the same reference numerals and signs are applied to the same members, and detailed description thereof will be omitted. In detail, similar to the airbag body 20 of the first embodiment, the front side attachment portion 35FD is arranged at a position farther rearward which becomes the central side in the front-rear direction of the airbag body 20D than the front edge 29c side of the end side inflation portion 29. In the front side attachment portion 35FD, the attachment hole 35a which is an attachment position respect to the body 1 side and through which the bolt 12 is inserted is positioned further upward than the attachment holes 35a of other attachment portions 35. In other words, the front side attachment portion 35FD is configured to have a greater amount of upward protrusion in a state where the airbag body 20D is flatly deployed than other attachment portions 35. A tension cloth 43D has the same configuration as the tension cloth 43A in the airbag 50 of the second embodiment, including the attachment to an airbag body 20C. Therefore, the alphabetic sign "D" is added to the end of the same reference numerals and signs for the same members, thereby omitting the detailed description. In the airbag 63, similar to the above-described airbag 50, a portion on the front edge 29c side of the end side inflation portion 29 is folded back at a folding line C3 (refer to FIG. 17) substantially along the vertical direction so as to be oriented toward the inner vehicle side I.

In the head protection airbag apparatus M3 of the third embodiment, thr end side attachment portion 35FD arranged in a region of the end side inflation portion 29 being configured to cause the front edge side of the airbag body 20D to be folded back and being the region to be folded back extends upper than other attachment portions 35. In the end side attachment portion 35FD, the attachment hole 35a formed at the attachment position to the body 1 side is positioned on the upper end side upper than other attachment portions 35. In other words, as illustrated in FIG. 16, the end side attachment portion 35FD is attached onto the body 1 side at a position away to the upper side than other attachment portions 35. Therefore, when folding back a portion on the front edge 29c side in the end side inflation portion 29 so as to be oriented toward the inner vehicle side I, for example, even if the portion is folded back at a portion immediately below the end side attachment portion 35FD, it is possible to attach the upper end side onto the body side with no difficulty. This is because, when attaching the airbag 63 which is folded by causing the lower edge 20b side to approach the upper edge 20a side after folding back onto the body 1 side of a vehicle, regarding the end side attachment portion 35FD, a region of the lower end side may be twisted. Therefore, despite of the configuration including the end side attachment portion 35FD, it is possible to cause the front edge 29c side in the end side inflation portion 29 to be folded back toward the inner vehicle side with no difficulty. As a result, it is possible to secure a degree of freedom of a position to be folded back.

Figure 21:
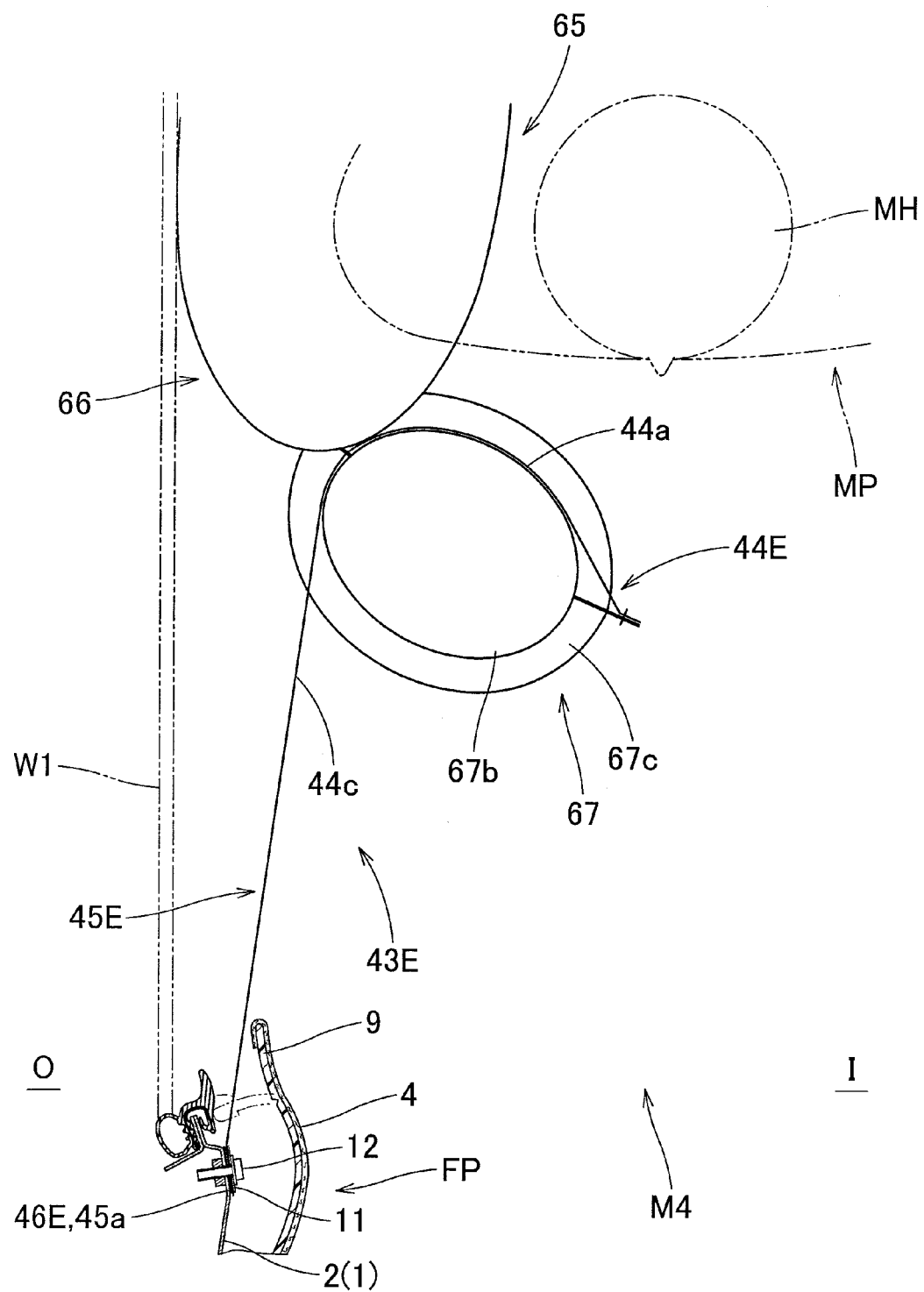
FIG. 21 is a schematic cross-sectional view along the front-rear direction illustrating a state where the airbag is completely inflated in the head protection airbag apparatus according to the fourth embodiment.

Subsequently, a head protection airbag apparatus M4 according to a fourth embodiment of the invention will be described. In the head protection airbag apparatus M4 of the fourth embodiment, as illustrated in FIG. 21, the members other than an airbag 65 have the same configurations as in the head protection airbag apparatus M1 of the first embodiment. Therefore, the same reference numerals and signs are applied to the same members, and detailed description thereof will be omitted.

Figure 18:
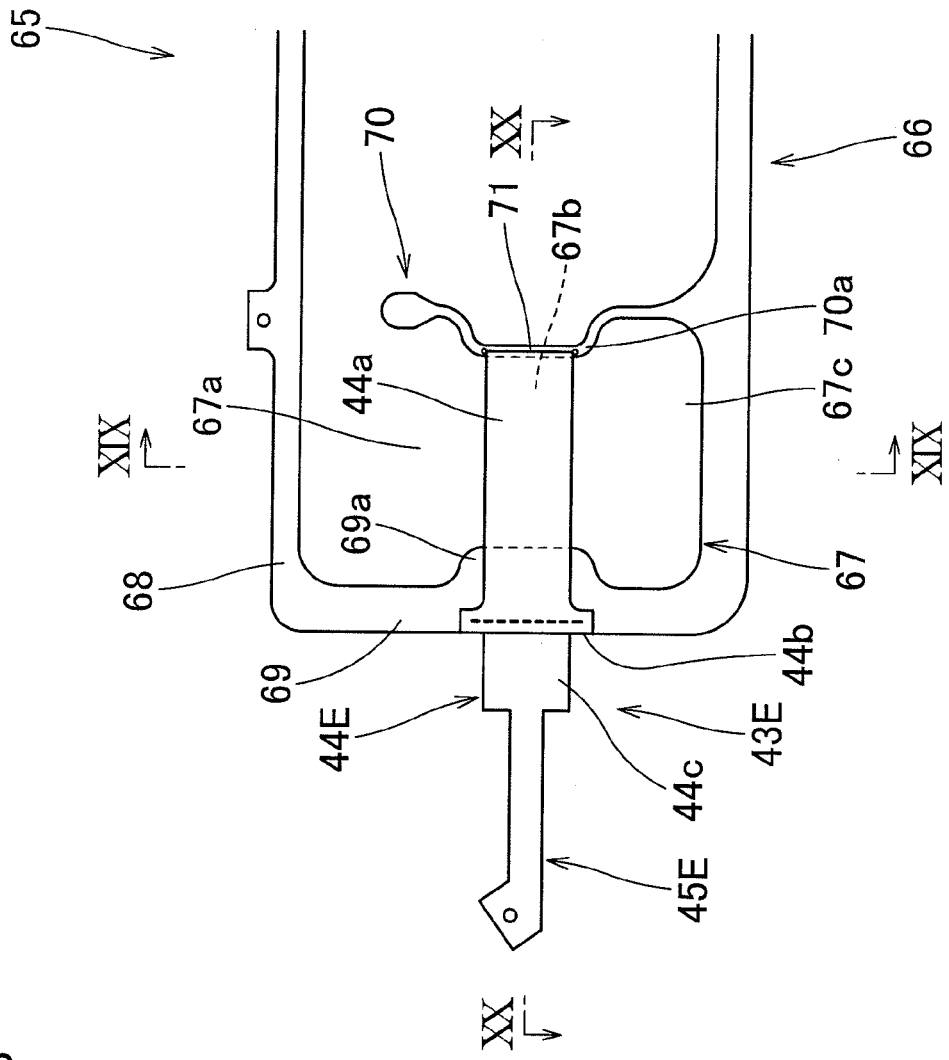
FIG. 18 is a partially enlarged front view illustrating a state where the airbag used in the head protection airbag apparatus according to a fourth embodiment of the present invention is flatly deployed.
Figure 19:
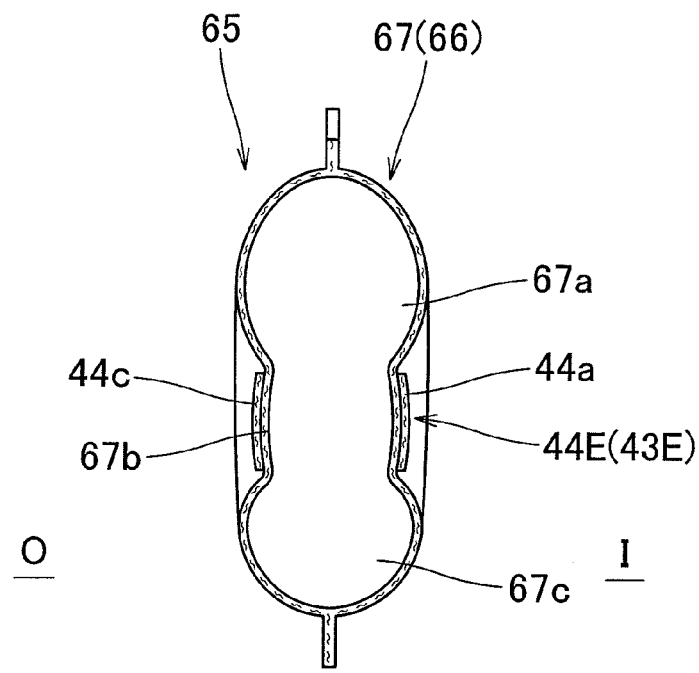
FIG. 19 is a partially enlarged cross-sectional view of a portion taken along line XIX-XIX in FIG. 18.
Figure 20:
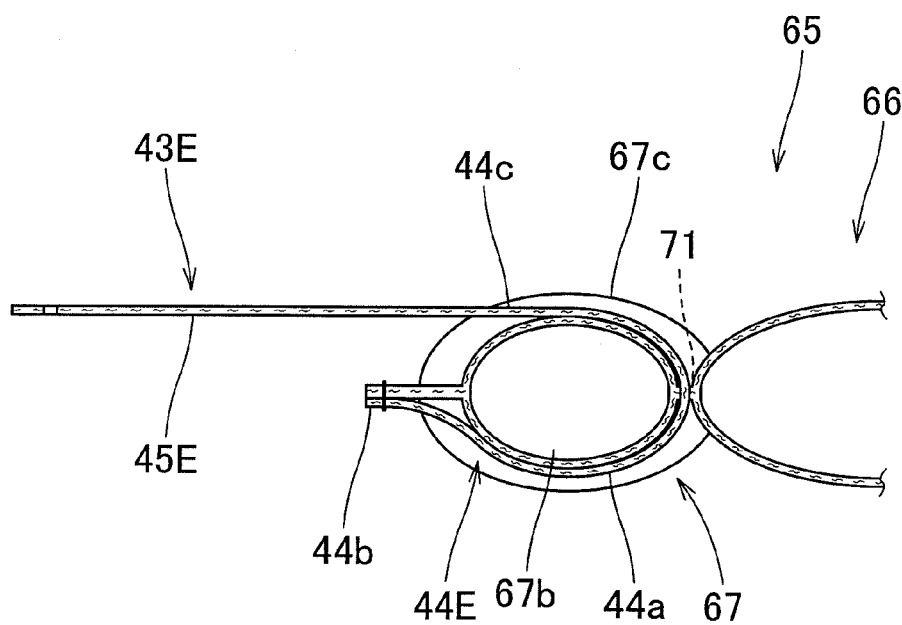
FIG. 20 is a partially enlarged cross-sectional view of a portion taken along line XX-XX in FIG. 18.

As illustrated in FIGS. 18 to 20, the airbag 65 used in the head protection airbag apparatus M4 of the fourth embodiment includes an airbag body 66 and a tension cloth 43E which is joined to the front end side of the airbag body 66. The tension cloth 43E has the same configuration as the tension cloth 43 in the above-described airbag 19 other than that the length dimension is slightly differed. Therefore, the alphabetic sign "E" is added to the end of the same reference numerals and signs for the same members, thereby omitting the detailed description. In the airbag 65, similar to the tension cloth 43 in the above-described airbag 19, in a state where the base portion end 44b is arranged so as to be oriented forward, the tension cloth 43E allows the base portion end 44b of a support portion 44E to be sewed (joined) to the inner vehicle side of a front edge side portion 69 in a peripheral edge portion 68, using sewing thread.

The airbag body 66 has the same configuration as the above-described airbag body 20 other than an end side inflation portion 67, the front edge side portion 69 of the peripheral edge portion 68 configuring the outer peripheral edge of the end side inflation portion 67, and a division portion 70. Therefore, the same reference numerals and signs are applied to the same members, and detailed description thereof will be omitted. In the airbag body 66, as illustrated in FIG. 19, at the time of completion of inflation, the end side inflation portion 67 is configured to have the smaller peripheral length on the direction side substantially along a region in the front-rear direction in which the tension cloth 43E is arranged than the peripheral length on the direction side substantially along other regions in the front-rear direction. In detail, in the embodiment, a vertically intermediate portion 67b which becomes a tension cloth arrangement region of which the outer peripheral side is covered by the support portion 44E of the tension cloth 43E is set to have the smaller peripheral length on the direction side substantially along the front-rear direction at the time of completion of inflation than an upper side portion 67a on the upper end side and a lower side portion 67c on the lower end side, which are vertically deviated from the tension cloth arrangement region. Specifically, the front edge side portion 69 of the peripheral edge portion 68 configuring the front edge side of the end side inflation portion 67 includes a protrusion portion 69a which is positioned at the vertically intermediate portion and partially protrudes rearward so as to enter the inside of the region of the end side inflation portion 67. A division portion 70 configuring the rear edge side of the end side inflation portion 67 also includes a protrusion portion 70a (refer to FIG. 18) which is positioned at the vertically intermediate portion facing the protrusion portion 69a at the front and the rear, and is partially bent and protruding forward so as to enter the inside of the region of the end side inflation portion 67. In the end side inflation portion 67, a region between the protrusion portions 69a and 70a configures the intermediate portion 67b as the tension cloth arrangement region. In other words, in the end side inflation portion 67, a vertically intermediate portion is configured to be depressed inward in the front-rear direction equivalently to the protrusion portions 69a and 70a which are arranged in the front-rear direction. In the end side inflation portion 67, the region configured to cause both of the edge sides in the front and the rear to be depressed configures the intermediate portion 67b in which the support portion 44E of the tension cloth 43E is arranged on the outer peripheral side. In the embodiment, each of the protrusion portions 69a and 70a are set to have a larger width dimension on the vertical direction side than the width dimension of the support portion 44E in the tension cloth 43E. A slit 71 through which the support portion 44E of the tension cloth 43E can be inserted is formed in a portion which becomes the vicinity of the front edge of the protrusion portion 70a formed in the division portion 70.

In the head protection airbag apparatus M4 of the fourth embodiment, at the time of completion of inflation of the airbag 65, the end side inflation portion 67 inflates so as to cause the intermediate portion 67b as the tension cloth arrangement region in which the support portion 44E of the tension cloth 43E is arranged on the outer peripheral side to be more depressed than other portions such as the upper side portion 67a and the lower side portion 67c which are vertically deviated from the tension cloth arrangement region. Therefore, the support portion 44E of the tension cloth 43E is arranged so as to fit into the depressed region formed on the outer peripheral side (between the upper side portion 67a and the lower side portion 67c) of the intermediate portion 67b of the end side inflation portion 67. As a result, at the time of completion of inflation of the airbag body 66, when the airbag body 66 receives the head of an occupant, it is possible to suppress the support portion 44E of the tension cloth 43E from vertically moving with respect to the end side inflation portion 67. Therefore, it is possible to protect the head of an occupant more invariably by the end side inflation portion 67 when completely inflated.

Figure 22:
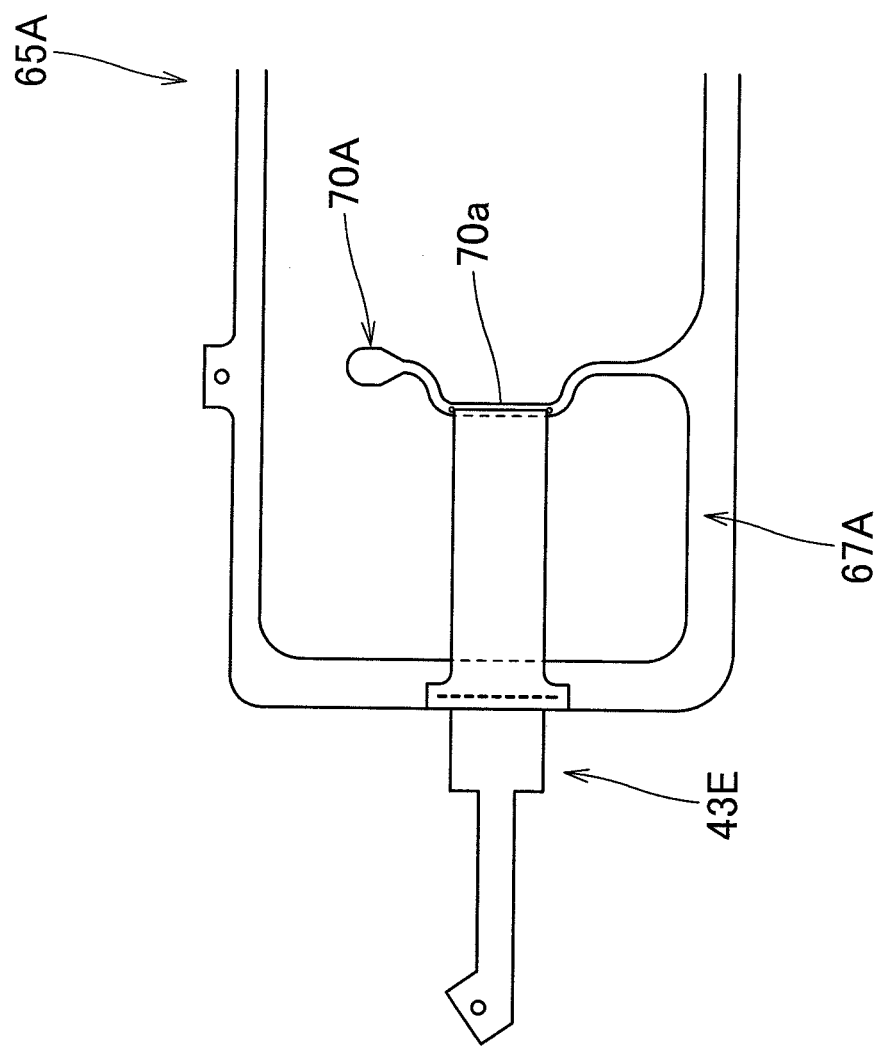
FIG. 22 is a partially enlarged front view illustrating a modification example of the airbag used in the head protection airbag apparatus according to the fourth embodiment.

In the embodiment, the tension cloth arrangement region (intermediate portion) is configured to cause both of the edge sides in the front and the rear of the end side inflation portion 67 to be depressed. However, it is possible to be configured as in an airbag 65A illustrated in FIG. 22 when the peripheral length on the direction side along the front-rear direction at the time of completion of inflation can be sufficiently shortened. In the airbag 65A, the protrusion portion 70a is arranged in only a division portion 70A configuring the rear edge side of an end side inflation portion 67A. In other words, in the airbag 65A, the intermediate portion 67b (tension cloth arrangement region) of the end side inflation portion 67A is configured to cause only the rear edge side of the end side inflation portion 67A to be depressed.

In the embodiment, an airbag having a configuration in which the end side inflation portion is arranged on the front edge side of the airbag body is exemplified for the description. However, the arrangement position of the end side inflation portion is not limited thereto. An airbag may have a configuration in which the end side inflation portion is arranged on the rear edge side of the airbag body.

What is claimed is:

1. A head protection airbag apparatus comprising:
   an airbag which is configured to be folded and accommodated on an upper edge side of a window on an inner vehicle side, of which the upper edge side is fixedly attached onto a vehicle body side, and which allows inflation gas to flow in to deploy and inflate so as to protrude downward and cover the inner vehicle side of the window; and
   an inflator which supplies the inflation gas to the airbag,
   wherein the airbag includes a flexible bag-like airbag body of which the upper edge side is fixed to the vehicle body side on the upper edge side of the window at a plurality of places along a front-rear direction, and a flexible sheet material-made tension cloth of which a base portion side is joined to one end portion side in the front-rear direction in the airbag body and of which a leading end side is fixed to the vehicle body side on a peripheral edge of the window away from the end portion of the airbag body,
   wherein the airbag body includes an end side inflation portion arranged at an end portion in the front-rear direction which becomes the tension cloth side at the time of completion of inflation,
   wherein the end side inflation portion is divided from other general inflation sections in the airbag body by a division portion which is positioned on a central side of the airbag body in the front-rear direction and arranged substantially along a vertical direction, and
   wherein the tension cloth is disposed in an arranged state so as to cover the inner vehicle side of the end side inflation portion, allows the base portion side to be joined to an end edge side of the end side inflation portion in the front-rear direction, is inserted into a slit formed in the division portion while being inverted so as to cover an outer vehicle side of the end side inflation portion, and allows the leading end side to be fixed to the vehicle body side.

2. The head protection airbag apparatus according to claim 1,
   wherein the tension cloth is arranged at a position upwardly away from a lower edge of the end side inflation portion at the time of completion of inflation.

3. The head protection airbag apparatus according to claim 1,
   wherein the airbag is folded and accommodated from a flatly deployed state by folding the airbag body which is in a state of being folded back at a folding line substantially along the vertical direction together with the tension cloth which is arranged while maintaining a state of extending from a joining portion joined to the airbag body to the central side in the front-rear direction so as to cause a lower edge side to approach the upper edge side so that a portion on the end edge side of the end side inflation portion in the front-rear direction is oriented toward the inner vehicle side.

4. The head protection airbag apparatus according to claim 3,
   wherein the tension cloth allows the base portion side to be joined to the end edge side of the end side inflation portion in the front-rear direction so as to cause the leading end side to be oriented toward a direction side separated from the airbag body in a state before inversion.

5. The head protection airbag apparatus according to claim 3,
   wherein the airbag body includes a protrusion piece portion which is partially protruded in order to join the base portion side of the tension cloth onto the end edge side of the end side inflation portion in the front-rear direction, and
   wherein the airbag body is folded back at the folding line in a portion which becomes the base portion side of the protrusion piece portion rather than the joining portion to which the base portion side of the tension cloth is joined in the protrusion piece portion.

6. The head protection airbag apparatus according to claim 4,
   wherein, on the inner vehicle side of the folded-back end side inflation portion, the tension cloth is configured to be distant from the folding line at which the end side inflation portion is folded back and to cause an extension portion extending to a fixing portion side toward the body side of the tension cloth to extend from the base portion side, and
   wherein the leading end side of the extension portion is away from the folding line to be temporarily joined to the fixing portion side toward the body side of the tension cloth, and the temporarily joined state can be released at the time of deployment and inflation of the airbag.

7. The head protection airbag apparatus according to claim 3,
   wherein an end side attachment portion fixing a portion of the end side inflation portion side on the upper edge side of the airbag body onto the vehicle body side is arranged at a position which becomes the central side of the airbag body in the front-rear direction rather than the end edge side of the end side inflation portion in the front-rear direction, to cause an attachment position onto the body side to be positioned further upward than other attachment portions.

8. The head protection airbag apparatus according to claim 1,
   wherein an end side attachment portion fixing a portion of the end side inflation portion side on the upper edge side of the airbag body onto the vehicle body side is arranged at a position which becomes the central side of the airbag body in the front-rear direction rather than the end edge side of the end side inflation portion in the front-rear direction.

9. The head protection airbag apparatus according to claim 8,
   wherein the end side attachment portion is arranged at the position which becomes the central side of the airbag body in the front-rear direction rather than the slit.

10. The head protection airbag apparatus according to claim 1,
    wherein the end side inflation portion is configured to be occluded on a lower end side and to cause the lower end side to be positioned on the end edge side in the front-rear direction rather than the slit.

11. The head protection airbag apparatus according to claim 1,
    wherein the end side inflation portion is configured to have a peripheral length on a direction side substantially along the front-rear direction of a tension cloth arrangement region in which the tension cloth is arranged to be smaller than a peripheral length on a direction side substantially along the front-rear direction of other regions which are vertically deviated from the tension cloth arrangement region at the time of completion of inflation.

* * * * *